US008088350B2

(12) United States Patent
Betz et al.

(10) Patent No.: US 8,088,350 B2
(45) Date of Patent: Jan. 3, 2012

(54) POLYSILAZANE THERMOSETTING POLYMERS FOR USE IN CHROMATOGRAPHIC SYSTEMS AND APPLICATIONS

(75) Inventors: William R. Betz, State College, PA (US); Christopher M. Linton, Millheim, PA (US)

(73) Assignee: Sigma-Aldrich Co. LLC, St. Louis, MO (US)

( * ) Notice: Subject to any disclaimer, the term of this patent is extended or adjusted under 35 U.S.C. 154(b) by 0 days.

(21) Appl. No.: 12/028,582

(22) Filed: Feb. 8, 2008

(65) Prior Publication Data
US 2008/0145276 A1    Jun. 19, 2008

Related U.S. Application Data

(62) Division of application No. 10/993,168, filed on Nov. 19, 2004.

(60) Provisional application No. 60/523,654, filed on Nov. 20, 2003.

(51) Int. Cl.
*C01B 33/04* (2006.01)
*B32B 9/04* (2006.01)
*C07C 7/12* (2006.01)
*B01D 24/00* (2006.01)
*B01D 39/00* (2006.01)
*B01D 39/14* (2006.01)

(52) U.S. Cl. ...... 423/347; 428/447; 585/820; 210/500.1

(58) Field of Classification Search ............... 422/70, 422/101, 100; 423/335, 347; 427/228, 377, 427/387, 388.2, 393.6, 397.7, 407.1, 407.2, 427/409, 489, 515, 541; 428/6.91, 421, 447, 428/448, 641; 524/496; 528/21, 26, 28, 528/31, 36, 38, 39; 556/412; 585/820; 95/48, 95/96, 88; 210/327, 500; 502/407
See application file for complete search history.

(56) References Cited

U.S. PATENT DOCUMENTS

| 4,277,525 A | 7/1981 | Nakayama et al. |
| 4,680,201 A | 7/1987 | Hjerten |
| 4,941,893 A | 7/1990 | Hsieh et al. |
| 4,980,235 A | 12/1990 | Scheer et al. |
| 5,008,422 A | 4/1991 | Blum et al. |
| 5,055,431 A | 10/1991 | Blum et al. |
| 5,080,844 A | 1/1992 | Su |

(Continued)

FOREIGN PATENT DOCUMENTS
DE        3717209 A1    12/1988
(Continued)

OTHER PUBLICATIONS

Bahloul, D. et al., "Pyrolysis Chemistry of Polysilazane Precursors to Silicon Carbonitride—Part 1.—Thermal Degradation of the Polymers", 1997, J. Mater. Chem., 7(1):109-116.

(Continued)

*Primary Examiner* — Jerry A Lorengo
*Assistant Examiner* — Jennifer Smith

(57) ABSTRACT

This invention relates to an amorphous non-glassy ceramic composition that may be prepared by curing, calcining and/or pyrolyzing a precursor material comprising silicon, a Group III metal, a Group IVA metal, and/or a Group IVB metal.

12 Claims, 9 Drawing Sheets

U.S. PATENT DOCUMENTS

| | | | |
|---|---|---|---|
| 5,192,406 A | 3/1993 | Wooley | |
| 5,208,192 A | 5/1993 | Yu et al. | |
| 5,325,916 A | 7/1994 | Dunne et al. | |
| 5,349,117 A | 9/1994 | Grasselli et al. | |
| 5,405,655 A | 4/1995 | Blum et al. | |
| 5,447,617 A | 9/1995 | Shieh | |
| 5,457,151 A | 10/1995 | Graef et al. | |
| 5,558,908 A | 9/1996 | Lukacs, III et al. | |
| 5,599,445 A | 2/1997 | Betz et al. | |
| 5,609,756 A | 3/1997 | Betz et al. | |
| 5,620,603 A | 4/1997 | Betz et al. | |
| 5,630,937 A | 5/1997 | Betz et al. | |
| 5,840,388 A | 11/1998 | Karger et al. | |
| 5,853,808 A | 12/1998 | Arkles et al. | |
| 6,048,457 A * | 4/2000 | Kopaciewicz et al. | 210/321.6 |
| 6,143,057 A | 11/2000 | Bulow et al. | |
| 6,200,474 B1 | 3/2001 | Kopaciewicz et al. | |
| 6,235,258 B1 | 5/2001 | Muller et al. | |
| 6,329,487 B1 | 12/2001 | Abel et al. | |
| 6,329,488 B1 | 12/2001 | Terry et al. | |
| 6,372,353 B2 | 4/2002 | Karger et al. | |
| 6,416,716 B1 | 7/2002 | Shukla et al. | |
| 6,444,326 B1 | 9/2002 | Smith | |
| 6,503,570 B2 | 1/2003 | Matsuki et al. | |
| 6,511,760 B1 | 1/2003 | Barone et al. | |
| 6,534,184 B2 | 3/2003 | Knasiak et al. | |
| 6,635,201 B1 | 10/2003 | Kopaciewicz et al. | |
| 2002/0096431 A1 | 7/2002 | Sevigny et al. | |
| 2005/0169803 A1 | 8/2005 | Betz et al. | |

FOREIGN PATENT DOCUMENTS

| | | | | |
|---|---|---|---|---|
| EP | 0424082 A | | 4/1991 | |
| GB | 2077710 A | | 12/1981 | |
| JP | 05017108 A | * | 1/1993 | |
| JP | 7267621 A | | 10/1995 | |
| JP | 09080038 A | | 3/1997 | |
| JP | 09157593 A | | 6/1997 | |
| JP | 10206407 A | | 8/1998 | |
| JP | 11170428 A | | 6/1999 | |
| WO | 9521020 A1 | | 8/1995 | |
| WO | 9837949 A1 | | 9/1998 | |
| WO | 9911582 A1 | | 3/1999 | |
| WO | 2004071619 A | | 8/2004 | |

OTHER PUBLICATIONS

Dismukes, J.P. et al., "Chemical synthesis of Microporous Nonoxide Ceramics from Polysilazanes", 1997, Chem. Mater., 9:699-706.

Gonon, M.F. et al., "Manufacture of Monolithic Ceramic Bodies from Polysilazane Precursor", 1995, J. European Ceramic Society, 15:591-597.

Impens, N.R.E.N. et al., "Chemical Surface Coating: Synthesis and Characterization of a Silicon Oxynitride Coated Silica Sel", 1997, Interface Science, 5:95-101.

Kojima, A. et al., "Characteristics of Polysilazane Compound and Its Application as Coating for Carbon Material", 2002, J Materials Science Letters, 21(10):757-760.

Li, Y-L et al., "Novel Transparent Polysilazane Glass: Synthesis and Properties", 2000, Advanced Engineering Materials, 2(5):290.

Motz, G. et al., "Special Modified Silazanes for Coatings, Fibers and CMC's", 2000, Ceramic Engineering & Science Proceedings, Eds. T. Jessen, E. Ustundag, 21(4):307-314.

Takeichi, "Deactivation of Metal Capillaries for Gas Chromatography," 1999, J Chromatography A, 845:33-42.

Surface of Nanoparticles and Porous Materials, Chapter 1, "Synthesis of a Polysilazane Coating on a Silica Gel via Chemical Surface Coasting Comparing Liquid- and Gas-Phase Chlorosilylations," Impens and Vansant, 1999, 78:1-13, Dekker, Inc. New York, New York.

International Search Report and Written Opiniion issued in PCT/US04/38832 dated Jun. 8, 2005, 8 pages.

Kroke, E., "Silazane Derived Ceramics and Related Materials," 2000, Mat Sci Eng Rpts, 26/4-6: 97-199.

Supplemental European Search Report issued in EP 04811535 mailed Apr. 24, 2008, 5 pages.

Office action issued in U.S. Appl. No. 10/993,168 dated Oct. 28, 2008, 14 pages.

Office Action issued in U.S. Appl. No. 10/993,168, dated Jun. 11, 2009, 15 Pages.

Final Office action issued in U.S. Appl. No. 10/993,168, dated Oct. 29, 2009, 15 pages.

Advisory Action issued in U.S. Appl. No. 10/993,168, dated Feb. 17, 2010, 6 pages.

Advisory Action issued in U.S. Appl. No. 10/993,168, dated Apr. 29, 2010, 4 pages.

Non-Final Office action issued in U.S. Appl. No. 12/028,596, dated Apr. 14, 2009, 8 pages.

Final Office action issued in U.S. Appl. No. 12/028,596, dated Sep. 17, 2009, 8 pages.

Advisory Action issued in U.S. Appl. No. 12/028,596, dated Nov. 23, 2009, 3 pages.

Advisory Action issued in U.S. Appl. No. 12/028,596, dated Jan. 5, 2010, 3 pages.

Office action issued in U.S. Appl. No. 12/240,424, dated Oct. 29, 2009, 9 pages.

Final Office action issued in U.S. Appl. No. 12/240,424, dated Apr. 14, 2010, 10 pages.

Office action issued in U.S. Appl. No. 12/240,401, dated Oct. 14, 2009, 12 pages.

Advisory Action issued in U.S. Appl. No. 12/240,401, dated Apr. 28, 2010, 3 pages.

Professional English Language Translation of Japanese Patent Application Publication No. 05-017108, published Jan. 26, 1993, 10 pages.

Non-final Office action issued in U.S. Appl. No. 12/240,424, dated Oct. 15, 2010, 15 pages.

* cited by examiner

TOTAL AREA % OF PARTICLES AT TIP ORIFICE = 90-93%
TOTAL AREA % OF VOID SPACES AT TIP ORIFICE = 7=10%

A: 2,5 - BIS(tert - butylperoxy) - 2,5 - dimethyl - 3 - hexyne
B: DICUMYL PEROXIDE
C: 1,1 - BIS - (tert - butylperoxy) - 3, 3,,5 - trimethylcyclohexane
D: 2,5 - DIMETHYL - 2,5 - di(2 - ethylhexanoylperoxy) hexane

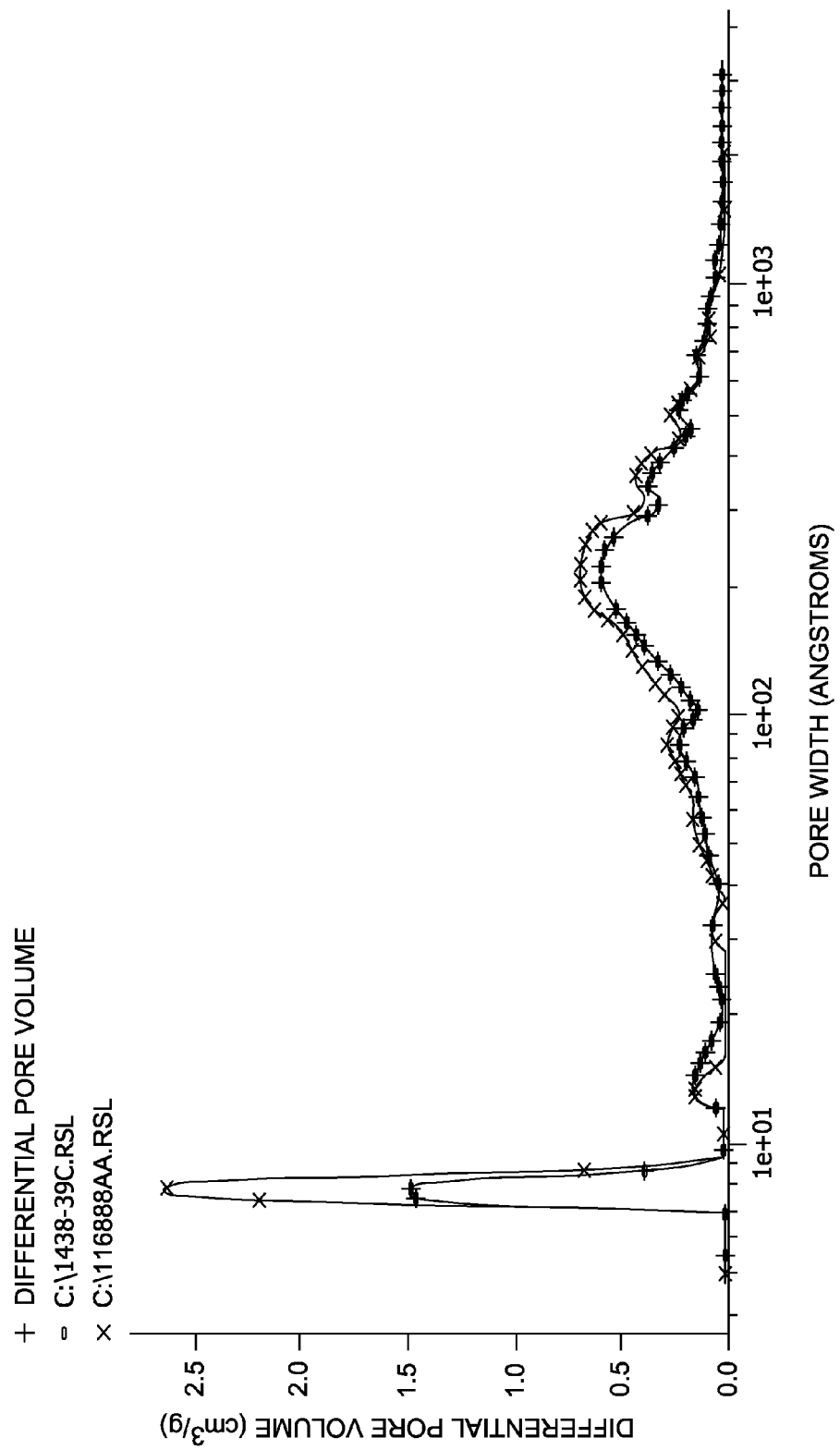

POLYSILAZANE THERMOSETTING POLYMERS FOR USE IN CHROMATOGRAPHIC SYSTEMS AND APPLICATIONS

CROSS REFERENCE TO RELATED APPLICATIONS

This application is a divisional of application Ser. No. 10/993,168 filed Nov. 19, 2004, which claims the benefit of provisional application Ser. No. 60/523,654, filed Nov. 20, 2003, each of which is hereby incorporated herein by reference in its entirety.

BACKGROUND OF THE INVENTION

This invention relates to an amorphous non-glassy ceramic composition that may be prepared by curing, calcining and/or pyrolyzing a precursor material comprising silicon, a Group III metal, a Group IVA metal, and/or a Group IVB metal. In particular, the composition is not irreversibly adsorptive for components or fluids that come into contact with it thereby allowing it to be useful as a passivation coating or film for any underlying substrate where it functions as a barrier against adsorption of components of the fluid to the underlying surface of the substrate. Further, the amorphous non-glassy ceramic composition functions as a highly useful matrix for a particulate adsorptive material, and/or as a film for adhering such adsorptive material to an underlying surface. Still further, the precursor material may comprise a polysilazane, polysiloxane, and particulate adsorptive material forming a fluid-permeable mass useful, for example, as an improved adsorptive bed in pipette tips.

There has been a long-identified need in scientific analytical techniques, such as chromatographic applications, to have the ability to coat a substrate thereby causing the substrate to be non-reactive with respect to a target analyte that comes into contact with the substrate. In particular, with respect to chromatographic applications, a coating useful to provide a barrier against adsorption of components in a fluid to the surface of a vessel, conduit, or device which is in contact with the fluid. Interactions between the target analyte and the surfaces of a vessel, conduit, and/or device may affect analytical results. This affect may be more pronounced in SPME applications where only a very minute amount of analyte is adsorbed. U.S. Pat. No. 5,192,406 discloses certain surface-deactivation techniques using polymeric silyl hydrides, siloxanes, silazanes and silicone polymers to deactivate glass or fused-silica CZE capillary columns without eliminating electro-osmotic flow. Further, deactivation of capillary columns for gas chromatography is also disclosed. However, no discussion is given to parts of the chromatographic apparatus other than the glass or fused silica columns.

Recently, the formation of silicon containing passivation films on various substrates has been dominated by techniques such as Chemical Vapor Deposition (CVD), Plasma CVD or wet chemical methods, including Sol Gel. These techniques can be effective, but suffer from several drawbacks requiring further improvement.

Silicon containing film forming processes utilizing CVD (e.g., U.S. Pat. Nos. 6,511,760 and 6,444,326) often suffer in some or all of the following areas: (1) contamination of the apparatus and substrate caused by formation of silicon particles in the gas phase reaction, thereby reducing production yields and/or requiring post-coating clean-up; (2) difficulty in obtaining a uniform film on uneven surfaces and/or presence of undesirable substances such as oxides in the film, caused by the gaseous nature of the raw materials; (3) low productivity caused by low film formation speeds; (4) necessity of complex and expensive equipment, such as high frequency generators and vacuum equipment; and (5) high reactivity and toxic nature of the gaseous raw materials, such as gaseous silicon hydride, requiring appropriate handling procedures and safety equipment to provide airtight conditions.

Researchers have attempted to produce passivating films from liquid silicon hydride containing raw materials with limited results. JP-A-29661 recites a process for forming a silicon-based thin film by liquefying a gaseous raw material on a cooled substrate and subsequently reacting it with active atomic hydrogen. This process involves complex equipment and is very difficult to control film thickness.

Low molecular weight liquid silicon hydride as a film-forming precursor is disclosed by JP-A-7-267621. However, the process recited is problematic due to the handling of unstable material and wettability problems associated with substrates of large surface area.

A solid silicon hydride polymer precursor was recited by GB-2077710A. However, the material is difficult to use due to poor solubility in common solvents.

Further, U.S. Pat. No. 6,503,570 discloses the synthesis of silylcyclopentasilane as a liquid film-forming precursor. This material is decomposed at temperatures below 500° C. and is easily dissolved in common organic solvents such as toluene, hexane, THF and acetone. Limitations of this approach include the complicated and costly synthetic procedure and the instability of the material in air.

U.S. Pat. No. 5,853,808 discloses the decomposition of chloroethylsilsesquioxane into thin ceramic films. Rearrangement reactions are generally conducted under intense UV light with the evolution of highly corrosive hydrochloric acid. Additionally, the high cost of production further limits this family of materials.

Sol Gel technology has been widely used in the formation of silica containing films and binder applications for small particles. Generally, the procedure involves the acid hydrolysis of metal alkoxides to form liquid sol solutions used in the above-mentioned applications. This liquid precursor technique suffers from limitations such as poor solvent compatibility and substrate wettability. Further, uneven coating and pinhole formation can be major problems along with the inability to create stable suspensions of particulate matter. Additionally, Sol solutions can be very unstable resulting in premature gelation and short shelf life. U.S. Pat. No. 4,277,525 describes a complicated method to eliminate the shortcomings of the technique. Generally, an alkoxysilane is mixed with a carboxylic acid or anhydride with a pK larger than 4. A third reactant, a monovalent or divalent alcohol such as methanol, ethanol or ethylene glycol, is added. A reaction accelerator is described as a different carboxylic acid with a pK not exceeding 4. Sol formation proceeds over several hours. Precautions are necessary so the exothermic reaction does not raise the temperature of the sol over 50° C. or gelation may occur. Along with the complexity of the Sol preparation, the large amounts of residual carboxylic acid may create wetting problems on some substrates.

To facilitate the handling of adsorbent particles, it may be helpful to agglomerate the particles into shaped forms, beads or the deposition of these particles on a substrate. A stable adherent coating of particles that resists delamination from the substrate in use may be advantageous for a variety of reasons, including (1) improvement of surface area to weight ratio; (2) reduction in the total amount of adsorbent required (3); protection of the underlying substrate from aggressive environments; and (4) the geometry of the substrate may be required to provide strength or form to the adsorbent system. A binding material is needed that allows for easy suspension of particulates, adequate adhesive properties to a variety of substrates, high stability and inertness in both liquid precursor and ceramic form, low interference with adsorbent porosity.

U.S. Pat. Nos. 5,325,916 and 6,143,057 both describe a wide variety of binding materials used in the creation of adsorbent structures composed of fine zeolite materials. Suitable binders include, macroporous clays, silicas, aluminas, metal oxides and mixtures thereof. These types of binding materials may be limited to more durable adsorbents such as zeolites or silicas and may not provide the inertness required for the subsequent desorption of many organic molecules.

Further, U.S. Pat. No. 5,599,445 discloses the use of a siloxane polymer adhesive as a binding material for various adsorbents including alumina, silica, organic polymer adsorbents and zeolites. Adsorbent films may be prepared and used as chromatographic stationary phases for volatile organic and permanent gas separation. The siloxane material may be used successfully, but adversely effects pore volume of the adsorbents. Additionally, these polymeric type materials have limited thermal stability resulting in unwanted volatile by products upon decomposition.

The current commercial pipette tips exhibit fracturing of the beds during tip usage, and therefore lack sufficient capacity. Also, several commercially available tips possess coatings only on the tip walls and therefore have limited capacity with analyte recovery significantly reduced.

The present invention seeks to reduce or eliminate the limitations of known compositions and methods due to the chemical properties of the macromolecules and decreased production costs allowing for use in a variety of chromatographic systems and applications.

SUMMARY OF THE INVENTION

Among the several aspects of the present invention is the provision of an adsorptive structure comprising particulate adsorptive material lodged in a matrix comprising an amorphous non-glassy ceramic composition and/or adhered to an underlying surface via a film comprising an amorphous non-glassy ceramic composition. The ceramic composition comprises an element selected from the group consisting of silicon, a Group III metal, a Group IVA metal, a Group IVB metal and combinations thereof and may be interrupted by nitrogen or carbon atoms. Further, the ceramic composition may be characterized by certain adsorption spectra having characteristic band ranges at various temperatures. The particulate adsorbent material is nucleophilic, electrophilic, or neutral and includes carbon, organic polymers, silicas, zeolites, aluminas, metal or ceramic powders, which are lodged in the ceramic composition such that the particles are accessible to contact with an analyte contained in a fluid. The underlying surface is selected from the group consisting of glass, metal, plastic, wood, fabric, ceramic or combinations thereof, and includes a chromatographic column.

Another aspect of the invention includes an adsorptive structure wherein the ceramic composition is derived from an oligomer comprising repeating units in which nitrogen is combined with an element selected from the group consisting of silicon, a Group III metal, a Group IVA metal, a Group IVB metal and combinations thereof. The ceramic composition may be prepared by mixing the particulate adsorptive material and the oligomer and heating until the ceramic composition forms.

Further aspects of the invention include chromatographic methods wherein a mobile fluid phase containing an analyte may be contacted with a stationary phase comprising particulate adsorptive material that is lodged in a matrix comprising an amorphous non-glassy ceramic composition and/or adhered to an underlying surface via a film comprising an amorphous non-glassy ceramic composition, the ceramic composition comprising an element selected from the group consisting of silicon, a Group III metal, a Group IVA metal, a Group IVB metal and combinations thereof. The stationary phase may comprise a packing for a chromatographic column or solid phase extraction device wherein said packing comprises discrete adsorptive bodies. Alternatively, or in addition, the stationary phase may comprise a ceramic film on the interior surface of a chromatographic column wherein the particulate adsorptive material is lodged in or adhered to the interior surface via the film.

Other aspects of the invention include a chromatographic separation device comprising a tubular column and, on a wall of said column, a film comprising an amorphous non-glassy ceramic composition and a particulate adsorptive material, the adsorptive material being lodged in said film or adhered via said film to said wall. The non-glassy ceramic composition comprises an element selected from the group consisting of silicon, a Group III metal, a Group IVA metal, a Group IVB metal, and combinations thereof.

Another aspect of the invention includes a composite comprising a non-glass substrate and a coating over a surface of the substrate providing a barrier against adsorption to the substrate of a component of a fluid in contact with the composite. The coating comprises an amorphous non-glassy ceramic composition that is derived from an oligomer comprising repeating units in which nitrogen is combined with an element selected from the group consisting of silicon, a Group III metal, a Group IVA metal, a Group IVB metal, and combinations thereof. The preparation of the non-glassy ceramic coating may comprise the application to the surface of the substrate a flowable dispersion comprising the oligomer followed by heating of the dispersion to form a ceramic composition. The non-glass substrates may be selected from the group consisting of copper, aluminum, steel, stainless steel, nitinol, bronze, zirconium, titanium, and nickel.

Another aspect of the invention includes a composite comprising a glass substrate and a coating over a surface of said substrate providing a barrier against adsorption to the substrate of a component of a fluid in contact with the composite. The coating comprises an amorphous non-glassy ceramic composition that is derived from an oligomer comprising repeating units in which nitrogen is combined with an element selected from the group consisting of silicon, a Group III metal, a Group IVA metal, a Group IVB metal, and combinations thereof. The glass substrates may include, for example, inlet sleeves, wool, syringe barrels, sample vials, connectors (such as press-tight, column, and seal), adsorbent trap assemblies and thermal tubes.

Further aspects of the invention include a fluid-permeable mass comprising a particulate adsorbent material dispersed in a matrix comprising a polysilazane polymer and a polysiloxane polymer; a solid phase adsorptive device comprising a conduit or vessel having a particulate adsorptive material entrapped therewithin by a binder comprising a polysilazane polymer and a polysiloxane polymer; and a process for preparing a fluid-permeable mass comprising a particulate adsorbent material dispersed in a polymeric matrix comprising preparing a dispersion comprising the particulate adsorbent material in a liquid medium comprising a solvent, a polymerizable silazane and a polymerization initiator, the polymerizable silazane comprising a polysilazane monomer, a polysilazane oligomer, or a mixture thereof; and polymerizing the polymerizable silazane to form said fluid-permeable mass.

A further aspect of the invention includes a pipette adapted for solid phase extraction, the pipette comprising a barrel and a tip, the tip containing a fluid-permeable mass comprising a particulate adsorbent material dispersed in a matrix comprising a polysilazane polymer.

Another aspect of the invention includes a pipette adapted for solid phase extraction, the pipette comprising a barrel and a tip, a particulate adsorptive material being entrapped within the tip by a binder comprising a polysilazane polymer.

Still further aspects of the invention include a process for adhering a particulate adsorptive material to an interior wall of a conduit or vessel comprising establishing a dispersion comprising the particulate adsorbent material within the conduit or vessel, the dispersion comprising the adsorbent material in a liquid medium comprising a solvent, a polymerizable silazane and a polymerization initiator, the polymerizable silazane comprises a polysilazane monomer, a polysilazane oligomer, or a mixture thereof; and polymerizing said polymerizable silazane to form a binder entrapping said adsorptive material within said conduit or vessel.

A further aspect of the invention includes a method for separating a target compound from a sample comprising a fluid medium containing said compound, the method comprises drawing the sample into a vessel or conduit containing an adsorbent bed, the adsorbent bed comprising particulate adsorbent material dispersed in an adhesive matrix or entrapped by an adhesive binder, the adhesive matrix or binder comprising a polysilazane polymer and a polysiloxane polymer; and allowing said target compound to be adsorbed to particles of said adsorbent material.

Other objects and features will be in part apparent and in part pointed out hereafter.

DESCRIPTION OF THE PREFERRED EMBODIMENTS

Figure 1:
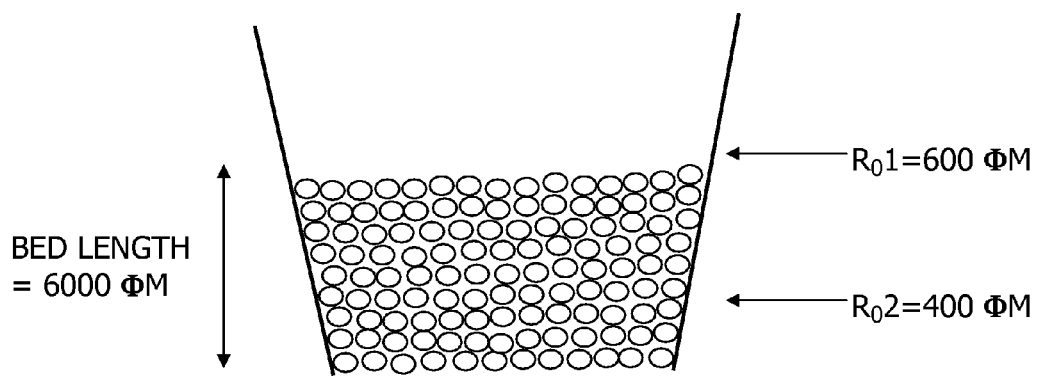
FIG. 1 is a schematic longitudinal section of a pipette having a fluid-permeable mass in the form of an adsorptive bed for use in a pipette tip.

In accordance with the invention, it has been discovered that an amorphous non-glassy ceramic composition with highly useful properties can be prepared by curing, calcining and/or pyrolyzing the polysilazane polymer. The composition obtained has been found to be not irreversibly adsorptive for components of fluids that may come in contact with it. It has, therefore, been found useful as a passivating coating or film for an underlying substrate where it functions as a barrier against adsorption of components of the fluid to the underlying surface of the substrate. Thus, the composition is useful as a coating for the walls of a vessel containing the fluid, or for the interior wall of a conduit through which the fluid flows. The ceramic composition comprises an element selected from the group consisting of silicon, a Group III metal, a Group IVA metal, a Group IVB metal, and combinations thereof. Preferably, the ceramic composition has a relatively low Young's modulus, a relatively low flexural modulus, and a relatively high elongation as compared to crystalline silica or conventional silica glass. Consequently, the composition possesses a greater degree of flexibility as compared to crystalline silica and conventional silica glass. These properties are believed to contribute to the effectiveness of the ceramic composition as a barrier against adsorption of an analyte onto the underlying surface. The relatively greater flexibility of the ceramic composition of the invention tends to reduce crazing and fracturing which might otherwise create fissures through which an analyte could pass and be adsorbed to the substrate surface. The ceramic composition is characterized by a generally higher Young's modulus, higher flexural modulus and lower elongation than the polysilazane polymer from which it is derived; but it retains properties effective to protect its integrity against mechanical and thermal stresses to which it and its underlying substrate may be subjected during service.

It has further been discovered that the amorphous non-glassy ceramic composition functions as a highly useful matrix for a particulate adsorptive material, and/or as a film for adhering such adsorptive material to an underlying surface. In this capacity, it again functions as a barrier against adsorption to the substrate of a component of a fluid in contact with the matrix or film. Thus, where the particulate adsorptive material is used in an adsorptive structure for the selective adsorption of an analyte from a fluid sample, such as a solid phase extraction or microextraction device, or an open chromatographic column, the ceramic adhesive film or matrix allows the particulate adsorptive material to have access to the analyte, but prevents adsorption to the substrate that would otherwise compromise the selectivity of the adsorption process.

Further, in accordance with the invention, an adsorptive structure may comprise a coherent body in which the aforesaid amorphous ceramic composition comprises a matrix wherein a particulate adsorptive material may be lodged.

Discrete coherent bodies of this nature can serve, for example, as packing for a chromatographic column.

The ceramic composition has a chemical structure comprising a network of oxygen and silicon, Group III, Group IVA, or Group IVB atoms linked predominantly oxygen to silicon, Group III, Group IVA, or Group IVB atom bonds. Without being held to any particular theory, it is believed that Group III metals and other Group IVA or Group IVB metals form bonds with nitrogen atoms in a manner similar to that of silicon atoms. In particular, germanium exhibits characteristics similar to that of silicon. The metals have an oxidation state of 3 or 4 and include germanium, boron, aluminum, titanium and gallium. It is believed that the amorphous ceramic composition has a general structure comparable to silicon oxide or germanium oxide, but differs in structure from silica glass in a manner that contributes to its unique and advantageous properties as a passivating film or matrix. Preferably, the ceramic composition comprises germanium or silicon, with silicon being economic and advantageous for an especially wide variety of applications.

In various preferred embodiments, the chemical structure of the ceramic composition may be interrupted either regularly or randomly by Group IVA or Group IVB atom to nitrogen atom or carbon atom linkages. Based on sputter depth profiling using Energy Dispersive Spectroscopy (FIG. 9), carbon and nitrogen atoms are present in the ceramic composition. For example, the ceramic composition may contain at least 30% carbon atoms and at least 2% nitrogen atoms at a depth of between about 1 and about 2000 Å, more typically, at least 40% carbon atoms at a depth of between about 1 and about 2000 Å, and/or at least 3% nitrogen atoms at a depth between about 1 and 2000 Å. Without being held to any particular theory, it is believed that these residual carbon and nitrogen atoms impart a degree of flexibility to the ceramic composition as compared to crystalline silica and conventional silica glass. The exact mechanism for imparting such flexibility is unclear. The flexibility of the composition may also, in part, be attributed to occlusions, perhaps very fine occlusions, within the ceramic composition. It is theorized that these occlusions may cause weakness in the composition of a nature that imparts a tendency to stretch or flex which exceeds any tendency to crack or craze. Accordingly, the ceramic composition's flexibility may be related to the residual carbon and nitrogen atoms and/or any occlusions present.

The ceramic composition of the present invention is derived from an oligomer comprising repeating units in which nitrogen is combined with an element selected from the group consisting of silicon, a Group III metal, a Group IVA metal, a Group IVB metal, and combinations thereof. To form the ceramic composition, the oligomer and particulate adsorbent material are heated. The characteristics of the ceramic composition are influenced by both the temperature and length of exposure to which the precursor oligomer and particulate adsorbent material are subjected. When heated to an effective temperature range, the oligomer is converted to a cross-linked polymer film. Typically, the cross-linked polymer film may be formed in a temperature range of between about 25° C. to about 450° C. Upon heating to elevated temperatures, the cross-linked polymer film converts to a ceramic state. Typically, the conversion of the cross-linked polymer to the ceramic state occurs anywhere from about 400° C. to about 2200° C. In one embodiment, the conversion of the cross-linked polymer film to the ceramic state occurs at greater than about 400° C.

Figure 7:
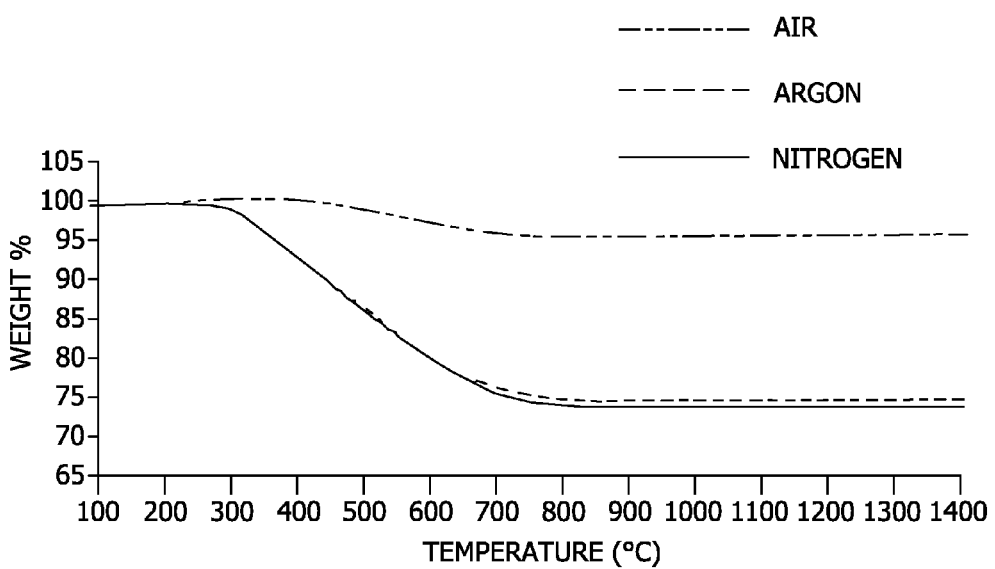
FIG. 7 is a graph depicting Thermal Gavimetric Analysis (TGA) used to measure the degree of conversion from the cross-linked polymer to the ceramic material at elevated temperatures in different atmospheric conditions.

The atmospheric conditions under which the heating occurs effects the nature of the cross-linking film that is formed. While the cross-linked polymer typically forms at a temperature of about 25° C. to about 250° C. in both air and inert atmospheres, the particular atmosphere does influence the degree of mass conversion to the ceramic material. Thermal gravimetric analysis (TGA) may be used to measure this degree of conversion. FIG. 7 shows the decline in weight of a polysilazane coating as it is converted to an amorphous non-glassy ceramic film. The figure plots residual film weight as a function of temperature during the curing process, expressed as a percentage of the initial dry polymer film weight. In air, approximately 95% of the weight of the starting material is retained after the conversion to the ceramic state. In contrast, in a nitrogen atmosphere, only about 75% of the weight of the starting material is retained after the conversion to the ceramic state. Preferably, the conversion occurs in air.

The formation of the cross-linked polymer film at relatively low temperatures advantageously allows the film to be handled and manipulated without any or with only minimal damage to the film. Also, the lower temperatures allow for easier application of multiple coatings. Further, the conversion of the cross-linked polymer film to the ceramic state at relatively low temperatures allows for a broader range of substrates to be utilized. In particular, certain substrates that are susceptible to cracking or other types of degradation at high temperatures, and thus unsuitable for coating, may be coated with the ceramic film described herein at relatively lower temperatures. Additionally, because the conversion from the cross-linked polymer film to the ceramic state may occur at temperatures lower than many other applications, common inexpensive ovens may be used to carry out the conversion, instead of relatively expensive high-temperature ovens.

The adsorptive structure of the present invention comprises between about 0.1 and about 99.8% by weight particulate adsorbent material. The percentage by weight of particulate adsorbent material varies with the particular application of the adsorptive structure. For example, when used in chromatographic applications, the range is typically 1 to 83% by weight adsorptive material. Preferably, the adsorptive coating comprises between about 20 and about 33% by weight adsorptive material.

The particulate adsorbent material may be nucleophilic, electrophilic, or neutral. For example, the particulate adsorptive material may be selected from carbon, organic polymers, silicas, zeolites, aluminas, metal or ceramic powders. Preferred organic polymer adsorbents useful in the compositions and constructions of the present invention include poly(divinylbenzene), copolymers or styrene and divinylbenzene, such as that comprised by the porous nonionic polymeric adsorbent material sold under the trade designation XAD™ by Supelco, Inc. of Bellefonte, Pa., polystyrene, the porous highly cross-linked methacrylate copolymer resins comprised by the adsorbent material sold under the trade designation Amberchrom™, also by Supelco, acrylic ester copolymers, acrylonitrile-divinylbenzene copolymers and various polymers comprising an aromatic backbone or aromatic pendant groups. A variety of other cross-linked polymer materials may also be used.

Carbon adsorbent material that are useful in practice of the invention include Carboxen 1006™ and Carbopack Z™, both by Supelco, Inc.

Although porous adsorbent materials are preferred for many applications, the particulate adsorbent material of the invention may also be constituted of substantially nonporous carbon, organic polymer or other nucleophilic materials.

Generally, the particulate adsorbent material range in size from about 1 nanometer to about 1 millimeter. The particle size distribution of the particulate adsorptive material is preferably such that at least 1% by weight thereof have a particle size from about 1 nanometer to about 1 millimeter. Advantageously, at least 50% by weight of the adsorbent material have a particle size from about 1 nanometer to about 10 nanometers. For some applications, the particle size distribution of the particulate adsorptive material is such that at least 1% by weight thereof have a particle size from about 0.1 micron to about 10 microns.

Preferably, the particulate adsorbent material may have a B.E.T. surface area between about 0.1 and about 4000 m$^2$/g. In certain preferred embodiments, the particulate adsorbent material has a B.E.T. surface area of at least 100 m$^2$/g. For certain other applications, e.g., use as an adsorbent bed in pipette tips, the particulate adsorbent material preferably has a B.E.T. surface area of at least 1 m$^2$/g and preferably at least 35 m$^2$/g. Typically, the adsorptive material may have a pore volume of about 0.01 to about 5 cc/g. For many embodiments, at least 85% of the pore volume of the particulate adsorptive material is constituted of pores having a pore size between about 2.5 Å and about 10,000 Å. For certain applications, at least 75% of the pore volume of the adsorptive material is constituted of pores having a pore size between about 3 to about 20 Å. For certain other applications, at least 75% of the pore volume of the adsorptive material is constituted of pores having a pore size between about 100 to about 300 Å. For still other applications, at least 75% of the pore volume of the adsorptive material is constituted of pores having a pore size between about 100 to about 2000 Å. In a particularly preferred embodiment, the adsorbent material is carbon based having a particle size predominantly between 0.2 and about 2.0 µm, a total pore volume of between 0.1 and about 3 cc/g, a macropore (diameter >500 Å) volume of between about 0.1 and about 2.0 cc/gm, a mesopore (diameter between 20 and 500 Å) of between about 0.1 and 2.0 cc/g, and a micropore (diameter 3 to 20 Å) of between about 0.1 and about 2.0 cc/g. Graphitic carbons are generally non-porous and present an external surface area in the range of 1 to 100 m$^2$/g. These may be suitable. A useful graphitized carbon sold by Supelco under the designation Carbopack X has a B.E.T. surface area of about 250 m$^2$/g and comprises a modest level of microporosity, less than about 0.5 cc/g.

Adsorbent material consisting of zeolite molecular sieves typically have a particle size of between 0.1 and about 5 microns, an average pore volume in the range of between about 0.3 and about 0.7 cc/g, and an average pore size in the range of about 5 Å. The B.E.T. surface area of zeolite molecular sieves is generally in the range of about 250 to about 400 m$^2$/g.

Adsorbent material consisting of activated alumina are generally in the submicron particle size range, i.e., between about 0.1 and about 5 microns. Activated alumina has an average pore size in the range of about 2 to about 100,000 Å, a pore volume of between about 0.25 and about 1 cc/g, and a B.E.T. surface area in the range of about 300 to about 400 m$^2$/g.

Activated silica adsorbent material have a particle size of between about 1 and about 10 microns, an average pore size of between about 0 and about 1000 Å, and a pore volume of between about 0.5 and about 20 cc/g. Silica gel has average pore size in the range of between about 3 and about 500 Å, and an average pore volume in the range of between about 0.5 and about 20 cc/g, and is available in a typical particle size of between 1 and about 1,000. B.E.T. surface area is ordinarily in the range of between about 20 and about 400 m$^2$/g in the case of activated silica, and between about 50 and about 1300 m$^2$/g in the case of silica gel.

Porous organic polymers produced by emulsion and/or suspension polymerization may be nondisperse (with respect to particle size), i.e., narrowly distributed within a particle size range of between about 1 and about 2 microns. Such porous polymer bodies exhibit a very wide range of B.E.T. surface areas, e.g., from about 1 to about 1300 m$^2$/g, commonly 500 to 900 m$^2$/g, most typically 700 to 800 m$^2$/g. Pore sizes are in the range of between about 100 and 200 Å. Pore volume is generally in the range of between about 0.2 and about 2 cc/g.

For purposes of this disclosure, specific surface area, total pore volume, pore size distribution and contribution to total pore volume are values determined using nitrogen porosimetry analysis such as that described by S. J. Gregg and K. S. W. Sing in *Adsorption, Surface Area and Porosity*, Academic Press, New York, 1982 and P. A. Webb and C. Orr in *Analytical Methods in Fine Particle Technology*, Micromeritics, Norcross, Ga., 1987, the entire disclosures of which are incorporated herein by reference. An ASAP 2010 porosimeter (micromeritics, Norcross, Ga., USA), a surface area and pore volume instrument, was used to acquire the data reported herein in Example 18 and FIGS. 11A and 11B. Specific surface area determination involves exposing a known weight of a solid to some definite pressure of a non-specific adsorbate gas (i.e., nitrogen) at a constant temperature, e.g., at the temperature of liquid nitrogen, −196° C. During equilibration, gas molecules leave the bulk gas to adsorb onto the surface of the solid which causes the average number of molecules in the bulk gas to decrease which, in turn, decreases the pressure. The relative pressure at equilibrium (p) as a fraction of the saturation pressure ($p_0$) of the adsorbate gas is recorded. By combining this decrease in pressure with the volumes of the vessel and of the solid sample, the amount (i.e., the number of molecules) of gas adsorbed is calculated by application of the ideal gas laws. These data were measured at relative pressures ($p/p_0$) of approximately 0.001 to 0.05 where the Brunauer-Emmett-Teller (BET) equation for multi-layer adsorption typically applies. With the number of adsorbed gas molecules known, specific surface area was calculated using the known cross-sectional area of the adsorbate gas, nitrogen. For cases where only physical adsorption due to Van der Waals forces occurs (i.e., Type I Langmuir isotherms), the determination of surface from the observed changes in pressure is accomplished using the BET equation. Pore size and pore size distributions were calculated by obtaining relative data approaching $p/p_0=1$, i.e., in the regime where multi-layer adsorption and capillary condensation occur. By applying the Kelvin equation and methods developed by Barrett, Joyner and Halenda (BJH), the total pore volume and contribution to the total pore volume were obtained.

Figure 11B:
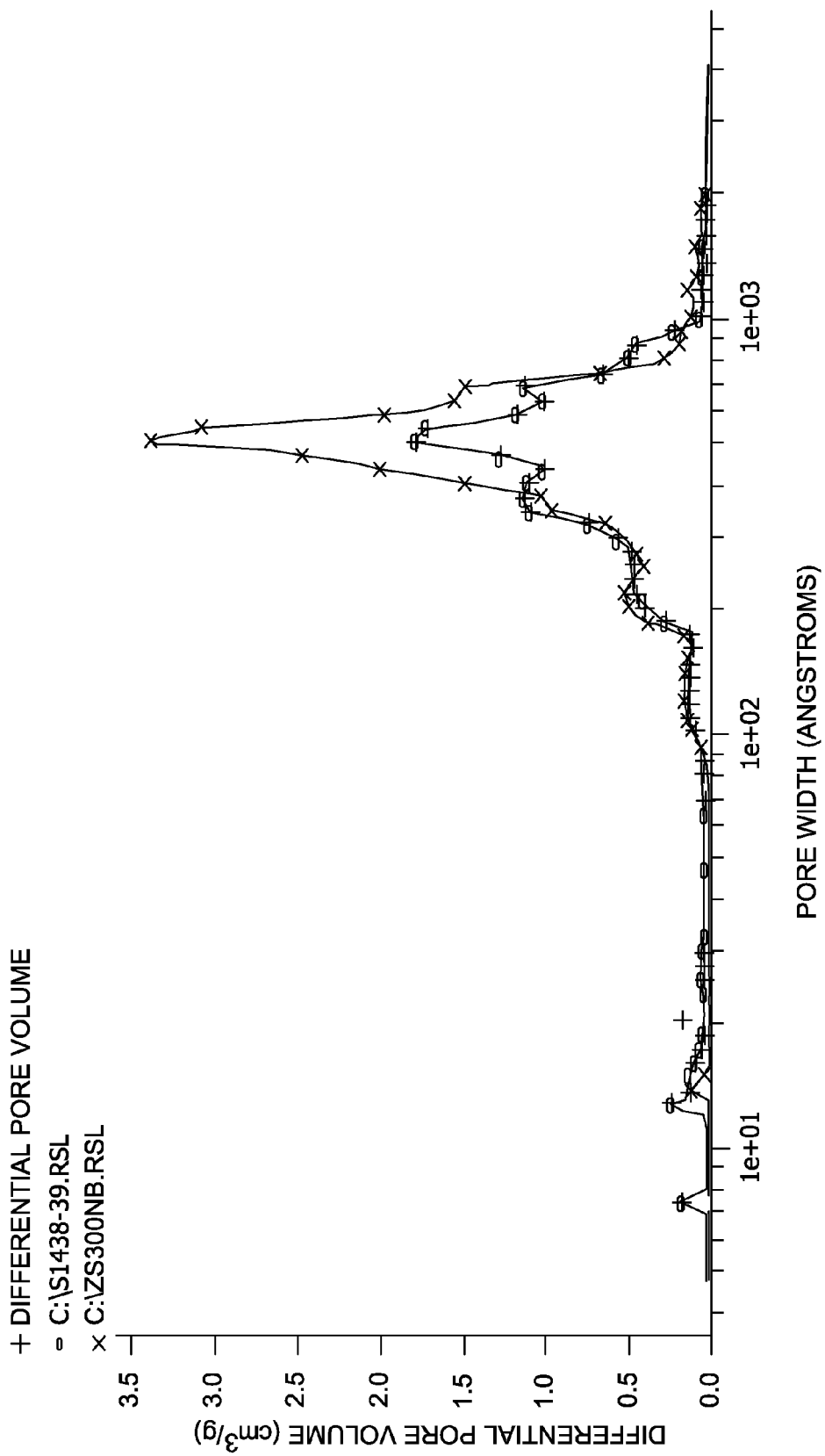
FIG. 11 depicts a graph showing the differential pore volume vs. the pore width for uncoated and coated Carboxen-1006 (FIG. 11A) and a graph showing the differential pore volume vs. the pore width for uncoated and coated 300 Å silica (FIG. 11B), both as described in Example 18.

The Density Functional Theory (DFT) plots, shown in FIGS. 11A and 11B, are graphs of the relative pressure values, $p/p_0$, which are correlated to the respective pore diameters, using a series of mathematical equations, at which the relative pressure values are obtained. The resulting plot thus relates the pore diameter, in angstroms, to the pore volume (i.e., the quantity of nitrogen adsorbed in the specified pore diameter region) values obtained.

With respect to FIG. 11A, the porosimetry data obtained indicates that the surface area was slightly reduced, but a significant amount of micropore region remained (site of primary adsorption work). Also, the mesopore and macropore diameters did not significantly change, as seen in the DFT plots. With respect to FIG. 11B, the data obtained indicates that a small amount of microporosity was created by the 2 adhesives laying in the pores, and a small amount of mesoporosity was lost due to the presence of the adhesives. However, a significant amount of working pore remained to perform the adsorption work.

The amorphous non-glassy ceramic composition may be applied to an underlying surface consisting of glass, or a non-glass material such as, for example, metal, plastic, wood, fabric, ceramic or combinations of thereof. For a wide variety of applications, the underlying surface is metal or glass. Preferable metals include, for example, copper, aluminum, steel, stainless steel, nitinol, bronze, zirconium, titanium, and nickel. The surface may be of any geometry capable of being coated by any known conventional method. In particular, surfaces may include tubing, transfer lines or other conduits, the interior wall of the barrel of a syringe (such as that used for sample transfer or for an SPME device as described in Pawliszyn U.S. Pat. No. 5,691,206), the interior surface of a thermal or solution desorption device, chromatographic fittings (such as valves, tees, elbows and the like), diaphragms, rotors, pathways, a vessel for conducting reaction or adsorption operations, the surface of an agitator for a stirred reaction vessel or adsorption contactor, GC and LC columns and instrument hardware (such as injection material liners, inlet disks, wool, detector assemblies, e.g., FID jets, mass spectrometry assemblies, e.g., ion trap parts), HPLC column hardware, sample loops, frits, filling devices for corrosive solid phase extraction materials, general housing and assemblies (such as nozzles, combustion/reaction chambers, spray rings, flow restrictors and the like), MALDI sampling plates, surfaces that require changes in hydrophobicity or chemical wettability, and containers for liquids and gases including SUMMA or TO type sampling. In a preferred embodiment, the underlying surface of the adsorptive material is an interior wall of a conduit or vessel for storage or transport of a fluid therein.

Generally, the ceramic composition has a thickness between about 1 nanometer and about 1 millimeter. Multiple layers of the ceramic composition may be provided over a substrate surface. By applying more than a single layer, cracking of the ceramic composition may be decreased or eliminated.

The ceramic composition may also comprise filler material to increase the thickness of the ceramic coating. Increasing the thickness of the coating may advantageously increase the physical strength of the coating, increase abrasion resistance, and provide increased protection of the underlying substrate. Filler material includes carbon, metal powders, ceramic powders, graphite, flakes, mica, zirconium and fumed silica. In a preferred embodiment, the filler material is mica, fumed silica, or zirconium. The filler material selected should be non-adsorptive for an analyte and preferably non-adsorptive for all components of a fluid which comes into contact with the ceramic composition.

To bond the particulate adsorbent material to the substrate, the particles are preferably suspended in a solution of the silazane oligomer or polymer and the substrate is contacted with the suspension at a temperature in the aforesaid range. The suspension may be prepared either with or without the aid of a solvent. When a solvent is used, essentially any organic solvent that provides effective solubilization of the polysilazane polymers and wets the particulate adsorbent material can be used for the reaction. Among the organic solvents that may conveniently be used are alcohols such a methanol, ethanol, isopropranol, and n-butanol, ketones such as methyl ethyl ketone, methyl isobutyl ketone, and methyl isopropyl ketone, ethers such as diethyl ether, methyl ethyl ether, and dipropyl ether, esters such as ethyl acetate, methyl butyrate, or amyl acetate, aromatic solvents such as benzene, toluene, and xylene, halogenated solvents such as chloroform, trichloroethane, and dichloromethane, and other common solvents such as dimethylformamide, dimethyl sulfoxide, tetrahydrofuran, etc. Aprotic solvents such as carbon disulfide and acetonitrile are also useful. Preferably, the solvent used is effective to wet the particulate adsorptive material, preferably carbon particles, at a temperature up to about 1000° C. Preferred solvents for this embodiment of the invention include pentane and dichloromethane. For graphitic carbon, tetrahydrofuran is especially preferred.

It is desirable to maintain the reaction mixture substantially free of moisture. As the most common source of moisture, the solvent preferably has a moisture content not greater than about 50 ppm, more preferably not greater than about 10 ppm. Conveniently, the polysilazane polymer is dissolved or dispersed in the solvent with aid of agitation or exposure to ultrasound. Mechanical agitation or sonication are also preferably used to aid in obtaining a uniform dispersion of the adsorptive material in the solution.

Concentrations and ratios of reactants are not narrowly critical; nor is pressure. Conveniently, the silazane content of the solution or dispersion may be between about 1 and about 1000 gpl, and the concentration of carbon or other dispersed particulate adsorptive material in the pre-reaction slurry may be in the range of between about 1 and about 500 gpl, ordinarily 10 to 100 gpl. The ratio of the silazane to adsorbent is preferably from about 20 to 1 to about 1 to 1, more preferably from about 10 to 1 to about 2 to 1, and even more preferably from about 5 to 1 to about 2 to 1. More concentrated coating solutions, in the range of 35 to 80 gpl can be used to provide multiple layers of carbon in a single coat. Concentrations in the 10 to 30 gpl are generally effective to provide only a single layer of carbon particles of typical size, e.g., 0.2 to 1 micron. Nevertheless, coatings having multiple layers of carbon particles can be obtained from such relative dilute compositions by applying the coating in multiple cycles.

The reactions are readily conducted at ambient pressure, but pressures ranging from a high vacuum, −29.90" Hg, to a positive pressure of up to 10,000 psi can be tolerated without adverse effect on the reaction. When the slurry of particulate adsorptive material, generally carbon particles, in silazane solution has been brought into contact with the substrate, the solvent is removed. Preferably, the solvent is removed by evaporation, although other means known in the art may be utilized, such as, for example, sublimation.

The particulate material may be lodged in a matrix comprising the ceramic composition and/or adhered to an underlying substrate via a film comprising the ceramic composition. Where the adsorptive material is lodged in a ceramic matrix, particles of the adsorptive material may be accessible to an analyte by outcropping from the matrix or by flow of analyte through pores in the matrix to the adsorbent.

Further, the ceramic composition may be formed as a coherent body. The coherent body may comprise a core mass which may be coated with the ceramic composition. In such instance, the core mass may be selected from metal, glass, carbon, and silica. A preferred core mass is silica. An adsorptive structure may comprise a coherent body in which particulate adsorptive material is lodged in a matrix comprising the ceramic material. As discussed above, the particulate material may outcrop from the ceramic matrix; or an analyte in a fluid with which the coherent body is contacted may have access to the adsorptive particles by flow through pores in the matrix. An adsorptive bed may be formed from a plurality of discrete adsorptive bodies having any of the alternative structures described above. Such adsorptive bed may function, for example, as packing for a chromatographic column. Such a column may comprise a tubular member containing a bed comprising such packing material. The adsorptive structure may also comprise a monolithic mass consisting essentially of the ceramic composition.

In any of the various embodiments detailed above, the ceramic film, in which the particulate adsorptive material is lodged, may not substantially be irreversibly adsorptive of an analyte or other target compound that is adsorbed by said particulate adsorptive material. In this manner, the analyte is adsorbed almost entirely by the particulate adsorptive material thereby increasing the selectivity of adsorption.

The exact chemical nature of the ceramic composition has not been determined. However, using data from infrared spectroscopy and EDS depth profiling analysis, certain assumptions and characterizations may be made. For example, using EDS depth profiling analysis (see FIG. 9) at a depth of about 1 to about 2000 Å, carbon atoms have been found to be present in an exemplary ceramic composition at a concentration of at least 40%. Further, at the same depth range in the same example, nitrogen atoms have been found to be present at a concentration of at least 4% and Si—O bonded atoms have been found to be present at a concentration of at least 10%.

Figure 10A:
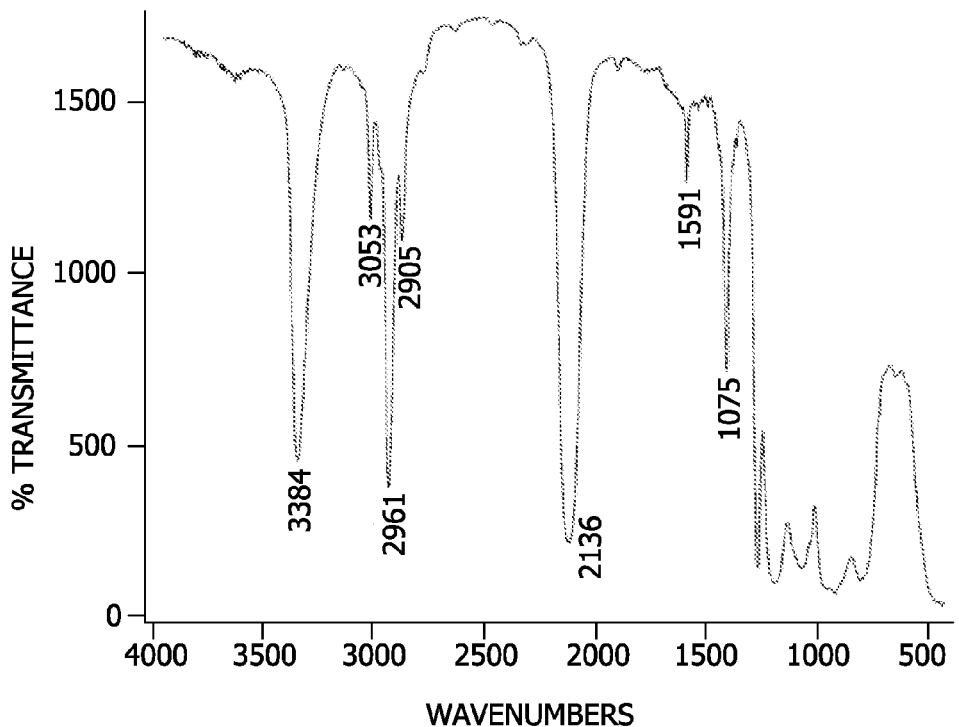
FIG. 10 depicts an infrared spectroscopy analysis of a silicon nitride passivation coating as described in Example 15.
Figure 10B:
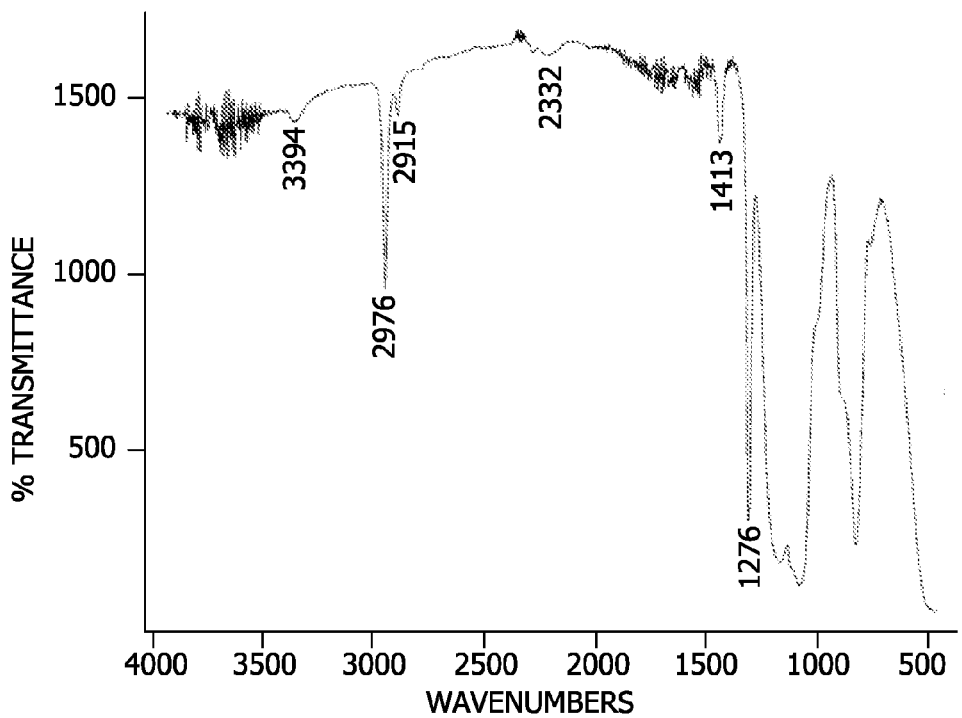

The information garnered from the Energy Dispersive Spectroscopy depth profiling analysis may be combined with information from IR spectroscopy to further characterize exemplary ceramic compositions. FIG. 10 depicts an IR spectra showing the composition of a polysilazane precursor material versus the composition of a ceramic film obtained by curing the precursor at 200° C. for 10 minutes, then 450° for 10 minutes. The precursor material possesses a characteristic band at 3384 cm$^{-1}$ representing Si—NH—Si bonds. This band is almost nonexistent in the final ceramic composition, indicating that such bonds are no longer present. Similarly, the Si—H band at 2136 cm$^{-1}$ of the precursor polysilazane film is not present in the final ceramic composition. However, the C—H band in the polysilazane film remains in the ceramic composition, although at a lesser intensity. These findings are consistent with findings of other researchers. D. Bahloul, et al. found that when pyrolysis temperature is increased, a decrease in the intensity is observed as well as a broadening of adsorption bands in a sample of the general formula (SiViH—NH)$_n$ where "Vi" is a vinyl group. Djamila Bahloul, et al., *Pyrolysis Chemistry of Polysilazane Precursors to Silicon Carbonitrile*, J. Mater. Chem., 1997, 7(1), pp. 109-116. In particular, the spectrum of a sample polysilazane pyrolyzed at 250° C. indicated a decrease in the band intensities of vinyl groups at 3047, 1592, and 1406 cm$^{-1}$. The Si—H stretching band at 2135 cm$^{-1}$ was also less modified. At 500° C., the adsorption bands arising from the N—H (3400, 1170 cm$^{-1}$), Si—H (2130 cm$^{-1}$) and vinyl groups (3050, 1594, 1404 cm$^{-1}$) were reduced considerably. As the temperature increased, the residual Si—H, N—H, and C—H bonds were eliminated.

An exemplary ceramic composition found to be useful in the various adsorptive structures and other embodiments of the invention has been found to exhibit an infrared vibrational absorption spectrum having a characteristic band of about 2976 cm$^{-1}$ for C—H. Additionally, this exemplary ceramic composition was found to have an infrared vibrational absorption spectrum having the following series of characteristic band ranges (values are in cm$^{-1}$): from about 1200 to about 900 for Si—O; from about 900 to about 600 for Si$_3$N$_4$; and from about 900 to about 600 for Si—C. Preferably, the ceramic composition may have an infrared vibrational absorption spectrum comprising the following series of characteristic band ranges at 250° C. (values are in cm$^{-1}$): about 3047, 1592, and 1406 for vinyl groups; and about 2135 for Si—H (stretching); and the following series of characteristic band ranges at 500° C. (values are in cm$^{-1}$): about 3400 and 1170 for N—H; about 2130 for Si—H; and about 3050, 1594, and 1404 for vinyl groups. Generally, the ceramic composition as measured by infrared spectroscopy may exhibit a decrease in the intensity of vinyl groups at 250° C. relative to said intensity at ambient temperature. Further, the ceramic composition may exhibit a decrease in the adsorption bands of vinyl and N—H groups at 500° C. relative to said adsorption bands at 250° C.

As previously noted, the ceramic composition of the present invention may be derived from an oligomer comprising repeating units in which nitrogen is combined with an element selected from the group consisting of silicon, a Group III metal, a Group IVA metal, a Group IVB metal, and combinations thereof. The oligomer may be combined with the particulate adsorptive material and heated to an effective temperature, as discussed herein, to first form a cross-linked polymeric film. Upon heating to a more elevated effective temperature, the cross-linked polymer film is converted to the ceramic composition. The temperatures for conversion to the polymer film and ceramic composition are as previously discussed. The conversion of the oligomer to the polymeric matrix or film and subsequent conversion to the ceramic composition may occur in air or in an inert atmosphere.

In a preferred embodiment, the silazane oligomer comprises repeating units having the formula:

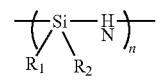

wherein:
R$_1$ is selected from the group consisting of hydrogen, vinyl, alkyl, hydroxy, alkoxy, amino, alkylamino, mercapto, acetoxy, halo, hydroxyalkyl, dimethylamino, oxime, isocyanate, CH$_2$Q-(OCH$_2$CH$_2$)$_n$OH,

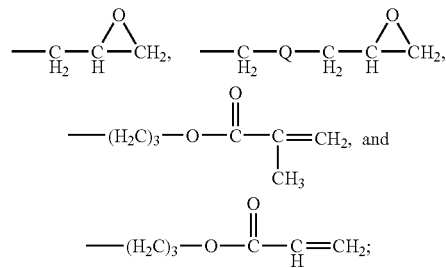

R$_2$ is selected from the group consisting of methacryl, C$_{1-20}$ alkyl, C$_{2-20}$ alkenyl, fluoroalkyl, carbonyl, carbinol, glycidyl, straight, branched or cyclic —(CH$_2$—O—CH$_2$)$_n$, and aryl optionally substituted with C$_{1-6}$ alkyl, fluoro, chloro, cyano or aryl;
Q is C$_{1-8}$, alkyl; and
n is 1 to about 20.
Preferably, R$_1$ is selected from the group consisting of hydrogen, vinyl, alkoxy, hydroxy, and alkyl. More preferably, R$_1$ is a vinyl group in at least one of the repeating units.
Preferably, R$_2$ is selected from the group consisting of hydrogen, vinyl, alkyl, aryl and fluoroalkyl. More preferably, R$_2$ is hydrogen or methyl.

In any of the above embodiments, n is preferably 2 to about 12, more preferably 3 to about 8, and most preferably 3 to about 6.

Advantageously, the oligomer comprises a cyclic silazane having from about 6 to about 10 ring atoms and having at least one vinyl substituent. In one particularly preferred embodiment, the oligomer has the formula:

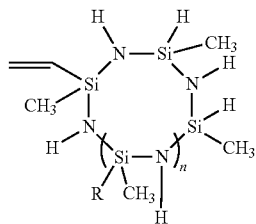

wherein R is H or —CH=CH$_2$ and n is 1 to 20.

The method of preparation of cyclic silazanes in accordance with the present invention can be found in U.S. Pat. No. 6,329,487, which is hereby incorporated in full by this reference. As described by U.S. Pat. No. 6,329,487, cyclic silazanes may be prepared from starting compounds such as methyldichlorosilane. During the initial ammonolysis, the silicon-chlorine bonds undergo ammonolysis thereby generating a diaminosilane, which is further converted into a linear molecule containing several Si—N structural units. This reaction is shown below.

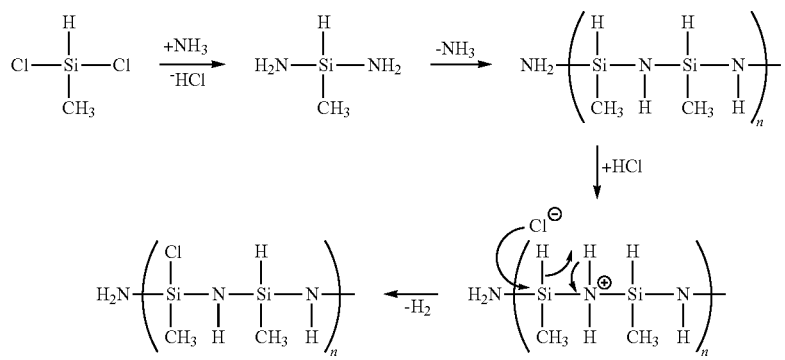

The linear structure is stabilized in anhydrous liquid ammonia containing an ionized ammonium halide salt dissolved therein. This ionized and dissolved ammonium halide salt acts as an acid catalyst which catalyzes a loss of Si—H bond to generate a new silicon-chlorine bond on the straight chain of the polymer. It is theorized that this linear structure can cyclicize forming a small ring in contact with the anhydrous ammonia solution as shown below.

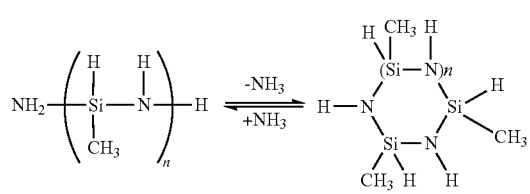

Generally, the silazanes and polysilazanes of the present invention can be prepared by the methods described in U.S. Pat. No. 6,329,487. Specifically, at least one halosilane, preferably having at least one Si—H bond, is introduced into at least twice the stiochiometric amount of liquid anhydrous ammonia relative to the silicon-halide bonds, and preferably at least from about five to about ten times. The anhydrous ammonia is maintained at a sufficient temperature and/or pressure to remain liquified during the process. During the ammonolysis process, ammonium halide salt created as a co-product is retained in the anhydrous liquid ammonia solution. The ammonium halide salt is substantially ionized and solubolized in the anhydrous liquid ammonia, and as such, provides an acidic environment for catalytically preparing the silazane and polysilazane compounds useful for the present invention.

In one preparation of an adsorptive structure, a flowable dispersion may be prepared comprising the oligomer and the particulate adsorbent material. The dispersion may then be applied to a surface of a substrate and heated to an effective temperature to form the ceramic composition. The dispersion may be applied by any known means of application. In particular, the dispersion may be applied by spray, brush, spin or dip coating or any combination thereof. Further, static or dynamic coating methods may be used in applying a coating comprising single or multiple layers. In the static method, a slurry of particulate adsorptive material, preferably carbon particles, in a silazane polymer solution is applied as a wet coating to the surface of the substrate, and solvent removed by application of heat and/or vacuum. Depending on the concentration of the carbon particles and the viscosity of the solution, a coating of 1 to about 20 carbon particles in thickness may be obtained in a single coating cycle. According to the dynamic coating method, the slurry is forced from a reservoir through a tubular column that is to be coated under inert gas pressure. A slug of the slurry moves ahead of the gas phase, leaving behind a film adhering to the interior column wall. As the slug moves forward, an annular transition segment of the slurry, having roughly a conical inside surface, moves along the wall behind the slug intermediate the slug and the wet, stable cylindrical film that is deposited on the wall. The thickness of the stable film is a function of the angle between the wall and the interior conical surface of this transition segment. It has been found that thicker films are associated with both high carbon concentration in the slurry and a relatively steep angle between the slug and substrate, i.e., both the advancing angle at which the front face of the slug meets the substrate, and the trailing angle between the transition segment and the substrate; and further that the steepness of the angle varies directly with the gas pressure.

In another preparation, the ceramic matrix composition is formed from heating a coherent precursor mass comprising the oligomer. The precursor mass may be formed from a dispersion comprising the particulate adsorptive material and the oligomer. Upon heating, the precursor mass produces a coherent body comprising the particulate adsorptive material dispersed in a matrix comprising the ceramic composition. Alternatively, the adsorptive particulate material may be applied over the surface of the coherent precursor mass comprising the oligomer. The resultant combination of the oligomer and the particulate adsorptive material may thereafter be heated to form a coherent body comprising the structure wherein the ceramic composition having the adsorptive material is dispersed over the ceramic composition surface.

Adsorptive coatings and structures generally of the type described hereinabove may be utilized in a chromatographic separation method. According to such separation method, a mobile fluid phase containing an analyte is contacted with a stationary phase comprising particulate adsorptive material that is lodged in a matrix comprising an amorphous non-glassy ceramic composition and/or adhered to an underlying surface via a film comprising an amorphous non-glassy ceramic composition. The ceramic composition comprising an element selected from the group consisting of silicon, a Group III metal, a Group IVA metal, a Group IVB metal, and combinations thereof. The nature of the ceramic composition is the same as described above. The stationary phase of this embodiment may be comprised of a packing for a chromatographic column or solid phase extraction device. The packing may be comprised of discrete adsorptive bodies as discussed herein having particulate adsorptive material lodged in a matrix of ceramic composition. Alternatively, the stationary phase comprises a ceramic film on the interior surface of a chromatographic column with the particulate adsorptive material being lodged in the film and/or adhered to the interior surface via the film. Preferably, the ceramic composition is not irreversibly adsorptive of an analyte contained in the mobile phase, more preferably not irreversibly adsorptive of any component of the mobile phase other than a carrier fluid. Most preferably, the ceramic composition is also not irreversibly adsorptive of the carrier fluid.

The present invention contemplates chromatographic methods including GC, liquid chromatography, PLOT, SPE, Maldi, TLC, and SPME. Depending on the type of chromatography being performed, the form of the ceramic composition may vary. For example, the ceramic composition may be in the form of a film or adsorptive bed, as previously described. For example, if high molecular weight analytes are to be chromatographically separated, then a thin film is preferred to minimize strong adsorption of the analytes to the film or low surface area adsorptive bed. If low molecular weight/low boiling point analytes are to be analyzed, then an adsorptive bed comprised of high surface area porous solids is preferred to effectively separate the analytes.

In another embodiment of the present invention, a chromatographic separation device comprising a tubular column and, on a wall of said column, a coating is contemplated. The coating is a film comprising an amorphous non-glassy ceramic composition and a particulate adsorptive material. The adsorptive material is lodged in the film and/or adhered via the film to the wall. The ceramic composition comprises an element selected from the group consisting of silicon, a Group III metal, a Group IVA metal, a Group IVB metal, and combinations thereof.

In the above described vessels, conduits, devices and other embodiments, the amorphous non-glassy ceramic composition may be applied to a substrate providing a barrier against adsorption onto the surface of a component in a fluid stored in the vessel or transported via the conduit or device. The ceramic composition is derived from an oligomer comprising repeating units in which nitrogen is combined with an element selected from the group consisting of silicon, a Group III metal, a Group IVA metal, a Group IVB metal, and combinations thereof. The coating, such as, for example, a film or thin layer, is effective to passivate a surface of a substrate where the function is mainly to passivate and prevent loss of an analyte to the walls of a vessel or conduit, the coating contains no particulate adsorbent material. The coating may be prepared by applying to the surface of the substrate a solution or flowable dispersion comprising the oligomer and heating the solution or dispersion to form the ceramic composition. As with the other embodiments, the oligomer may be heated to a temperature effective to convert it to a cross-linked polymer film. This cross-linked polymer film may be further heated at a more elevated temperature to convert it to a ceramic state. The temperature ranges for both conversions are as previously described.

Figure 8A:
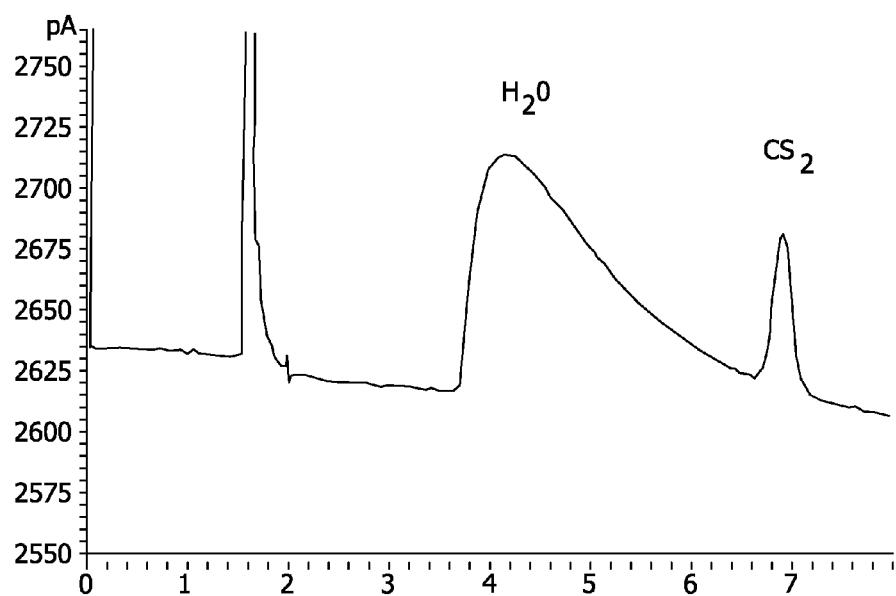
FIG. 8 compares the chromatographic analysis of a sample delivered to a chromatographic column through a 316SS transfer line that has been treated with polysilazane (FIG. 8A) vs. the analysis of an identical sample that has been delivered to the column through an untreated 316SS line (FIG. 8B) as described in Example 14.
Figure 8B:
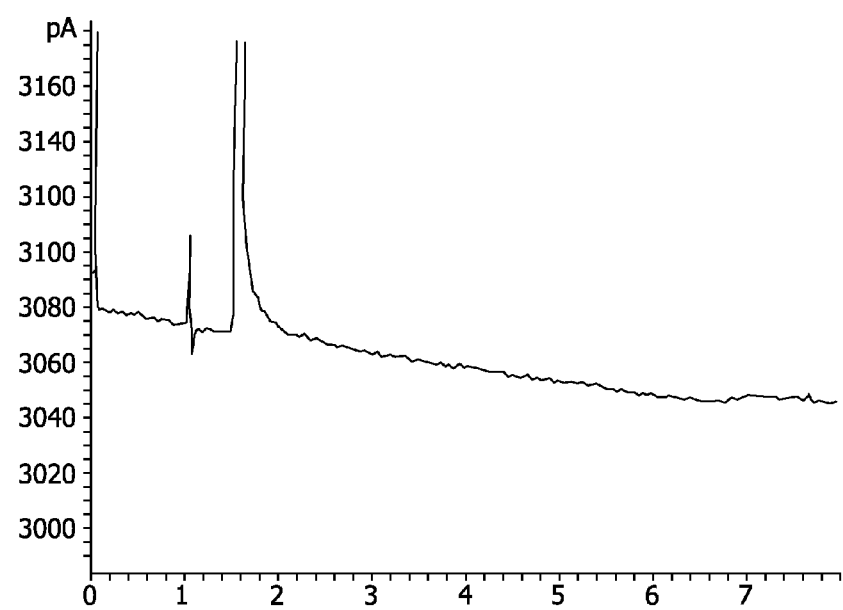

By applying the passivation coating to a surface of a substrate, as described above, the coated surface becomes non-adsorbent for an analyte contained in a fluid having contact therewith. As a result, less analyte is lost to interactions with the substrate. In particular, for SPME applications, in which a very minute amount of analyte is adsorbed, loss of even a fraction of the analyte to interactions with an uncoated surface may affect analytical results. Although SPME is an important application of the technology described herein, it is not so limited. FIGS. 8a and 8b, for example, show gas chromatographic (GC) analysis of trace levels of water and carbon disulfide. In the process which yielded the chromatogram of FIG. 8a, the sample has been fed through a stainless steel transfer line treated with a polysilazane passivation coating. In the process which produced the chromatogram of FIG. 8b, the stainless steel transfer line is untreated. From a comparison of the graphs, it is evident that the polysilazane treated tubing is adequately inert for active compound transfer into the analytical column resulting in separation and detection of the water and carbon disulfide analytes.

In one class of embodiments wherein the coating is used for passivation of a surface, the underlying surface is substantially glass, the underlying surface comprising of, for example, inlet sleeves, wool, syringe barrels, sample vials, connectors (such as press-tight, column, and seal), adsorbent trap assemblies and thermal tubes.

In a preferred class of embodiments wherein the coating is used for passivation of a surface, the underlying substrate is substantially non-glass. The non-glass substrate may be selected from the group consisting of metal, plastic, wood, fiber, fabric, ceramic or combinations thereof. A preferred non-glass substrate is metal. Alternatively, the non-glass substrate may be selected from copper, aluminum, steel, stainless steel, nitinol, bronze, zirconium, titanium, and nickel. The coating may be applied to any shape of surface. In particular, the coating may be applied to a non-glass conduit or vessel.

In those embodiments wherein the coating is used for passivating a surface, the substrate to be coated includes the interior walls or other working surfaces of devices and fittings which may come in contact with a fluid containing an analyte. Such devices and fittings may include tubing, transfer lines, pipe, valves, fittings and regulators (such as frits, diaphragms, rotors, pathways), GC and LC column and instrument hardware (such as GC injection materials liners, inlet disks, wool) GC detector assemblies (such as FID jets, mass spectrometry assemblies such as ion trap parts), HPLC column hardware, sample loops, and frits. Other surfaces include filling devices for corrosive solid phase extraction materials, SPME assemblies, general housing and assemblies (such as nozzles, combustion/reaction chambers, spray rings, flow restrictors), MALDI sampling plates. Further surfaces that may be suitable for the passivation coating include any surface that requires changes in hydrophobicity or chemical wettability, containers for liquids and gases, including SUMMA or TO type sampling canisters.

Optionally, the passivation coating functions to change the hydrophobicity/hydrophilicity of an underlying surface. In such embodiments of the invention, the surface of the ceramic film is derivatized to alter the characteristics of the underlying surface. In one application, the surface of a MALDI sample slide is converted to a hydrophobic surface so that when a water-based sample is applied to the surface of the slide, the geometry is preserved. In particular, the sample beads up on the surface of the slide allowing for a more concentrated sample and improved laser analysis.

The invention is further directed to a fluid-permeable mass comprising particulate adsorbent material that may be dispersed in a matrix comprising a polysilazane polymer and a polysiloxane polymer. The fluid-permeable mass may have a permeability of about 5 to about 20 μL/second. Preferably, the matrix is substantially not irreversibly adsorptive of an analyte or other target compound that is adsorbed by the particulate adsorbent material. Generally, the particulate adsorbent material may be selected from among those previously described. Advantageously, the fluid-permeable mass may contain at least 40% by weight of the particulate adsorptive material. Preferably, the fluid-permeable mass contains between about 50 and about 75% be weight particulate adsorptive material. The B.E.T. surface area of the particulate adsorbent material may be at least 1 $m^2/g$, preferably at least about 35 $m^2/g$. Further, the concentration of the particulate adsorptive material may be such that the surface area thereof is at least about 0.1 $m^2/cc$ of the fluid-permeable mass. Still further, the adsorptive material may have a pore volume of about 0.01 to about 5 cc/g. Typically, at least 85% of the pore volume of the particulate adsorptive material is constituted of pores having a pore size between about 2.5 Å about 10,000 Å. Preferably, for adsorption/desorption of peptides and proteins, a non-polar adsorbent with a pore size of about 200-300 Å should be selected. The particular adsorptive material is determined by the nature of the analyte sought. For a large number of applications a $C_{18}$-derivatized silica is preferred. One skilled in the art can readily determine an appropriate particulate adsorbent material.

The combination of the polysilazane polymer and the polysiloxane polymer of the present embodiment has particularly good qualities in the preparation of pipette tips wherein the fluid-permeable mass is in the tip of the pipette. The pipette tip can be constituted of any suitable material such as, for example, polyolefins, acrylates, methacrylates, stainless steel or Teflon. A preferred material is polypropylene. The tip may or may not be tapered. However, tapering of the pipette tip may provide better drop formation leading to less loss of analyte. Further, the particular size of the pipette opening influences the drop formation. For example, a tip orifice from about 350 microns to about 750 microns provides excellent drop formation of the final drop of fluid, thereby decreasing any opportunity for loss of analyte.

The use of both a polysilazane and a polysiloxane polymer, as opposed to the use of either one alone, provides superior adhesive properties. The advantageous adhesive qualities of the polysilazane and polysiloxane mixture allow for adhesion of the fluid-permeable mass ("an adsorbent bed") to the walls of a pipette tip. As further discussed below, the adsorptive mass may be formed in the tip by introducing a dispersion containing the binder polymers and the particulate adsorbent in a solvent vehicle. Although a siloxane alone functions well as an adhesive, the cured polysiloxane is inadequately permeable to a fluid sample, and thus inhibits access of an analyte to the adsorbent particles contained in the bed. If the siloxane concentration in the dispersion is reduced in an effort to impart porosity, there is a tendency for the adhesive to break in the middle/interior section of the bed, in which case the fluid sample may channel through the bed rather than gaining access to the adsorbent particles. On the other hand, silazane alone functions well to maintain the integrity of the middle/interior section of the adsorbent bed while maintaining effective tip flow, but the adhesion of the bed to the pipette tip walls is ineffective. Additionally, the use of a silazane adds stability to the siloxane adhesive (i.e., eliminates swelling) and improves flow of the fluid containing the analyte through the bed. It is believed that the improved flows result from slight constriction of the adhesive combination which opens the interstitial space(s) of the adsorbent bed. Accordingly, the combination of a siloxane and silazane polymer functions to overcome these obstacles by providing an adhesive that functions to (1) eliminate bed breakage in the middle/interior section of the bed thereby stabilizing the tip, (2) permit effective tip flow, (3) improve analyte recovery due to the inertness of the tips, (4) increase binding capacity since little or no adhesive interference occurs with the adsorbent, and (5) improved adherence of the bed to the pipette tips walls due to the adhesive strength of the adhesive combination.

The chemical structure of the silazane is as described previously herein. A preferred silazane is an oligomer or polymer having a molecular weight of about 200 to about 2,000,000, more preferably from about 200 to about 600.

The general chemical structure of the polysiloxane repeating units may be represented by the following formula:

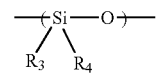

wherein
  $R_3$ is hydrogen, substituted or unsubstituted hydrocarbyl, alkoxy, aryloxy, nitro, cyano, amino, hydroxy, or an —O—Si≡ moiety; and
  $R_4$ is hydrogen, methacryl, $C_{1-20}$ alkyl, $C_{2-20}$ alkenyl, fluoroalkyl, carbonyl, carbinol, glycidyl, straight, branched or cyclic —$(CH_2—O—CH_2)_n$, and aryl optionally substituted with $C_{1-6}$ alkyl, fluoro, chloro, cyano or aryl.

Preferably, one of $R_3$ and $R_4$ is hydrogen in about 1% to about 10% of the polysiloxane repeating units, more preferably from about 3% to about 8%.

The siloxane may include polar groups such as, for example, —OH, —$(CH_2)_n$CN, —$C_6H_5$—OH, or —$C_6H_5$—$NH_2$. Generally, the polysiloxane tip for use in certain pipette tip applications is a long-chain polymer preferably with a molecular weight of about 400,000 to about 800,000. A typically useful polysiloxane has a molecular weight of approximately 600,000. The chain should be of sufficient length to wrap around the particulate adsorbent material, i.e., $C_{18}$-silica, and also have sufficient surface contact to covalently bond with the polyolefin, acrylate, methacrylate, stainless steel or Teflon pipette tip walls and stabilize the entire adsorbent bed. A preferred siloxane is polydimethylsiloxane with 1-10% Si—H groups (approximately 600,000 Mw).

U.S. Pat. No. 5,599,445, incorporated herein in its entirety, describes an improved means of bonding granular, particulate, or fibrous adsorptive material to a substrate. Generally, it disclosed that the direct C—Si bond between an adsorptive carbon or polymer body and a siloxane polymer provides an advantageous means for bonding an adsorbent to a substrate, such as, for example, glass. Preferably, the siloxane has the formula:

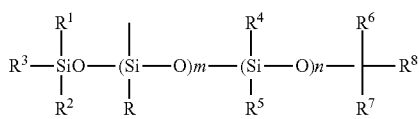

wherein
R is hydrogen, substituted or unsubstituted hydrocarbyl, alkoxy, aryloxy, nitro, cyano, amino, hydroxy, or an —O—Si≡ moiety;
$R^1$, $R^2$, $R^3$, $R^4$, $R^5$, $R^6$, $R^7$, and $R^8$ are independently selected from the group consisting of hydrogen, substituted or unsubstituted hydrocarbyl, nitro, cyano, and an —O—Si≡ moiety; and
m+n is such that the average molecular weight of the polymer is between about 80,000 and about 2 million, preferably between about 250,000 and about 500,000.

It is generally preferred that at least one of $R^1$ through $R^8$ be hydrogen, so that the polysiloxane has a hydrosilyl functionality of at least 2. Having such a structure, the polymer can react with both carbon at the surface of the carbon adsorptive material, to provide the thermally stable ≡C—Si≡ bond, and silanol groups at the surface of the glass to provide the —Si—O—Si— bond through which the polysiloxane is bound to the glass. While a hydrosilyl functionality of 2 is the minimum required for the above reaction, it is generally preferred that between about 1% and about 10% of the $R^1$ through $R^8$ substituents on the backbone silicon atoms be hydrogen.

Many suitable siloxane polymers are immiscible with polar solvents, while the silazane polymer is usually miscible with both polar and non-polar solvents. The use of a non-polar siloxane with an apolar silazane may advantageously force the analytes into the pores of the particulate adsorbent material, i.e., $C_1$-silica, where the adsorption/desorption work is performed. Typically, the solvent assists in the dispersion of the adhesive so it does not block the pores of the adsorptive particles. Without being held to any particular theory, it is believed that rapid evaporation of the solvent is the driving force that pulls the siloxane away from the pores.

The selection of a solvent is largely based on density and miscibility with the siloxane. The solvent has a desired density is from about 1.4 to about 2.2 g/mL. Any non-polar solvent with this density will suffice (i.e., chloroform, carbon tetrachloride, pentachloroethane). Preferably, the density of the solvent is about 1.6 to about 2.0 g/mL so that after addition of adhesives and an initiator, the density of the resulting solution or dispersion matches the density of a 40-60 µM silica particle. A preferred solvent is pentachloroethane. Pentachloroethane has the advantages of effective density (1.685 g/mL), low vapor pressure (no rapid evaporation when working with suspension), and clarity (easier to monitor the suspension behavior).

When heated to an effective temperature, the silazane and siloxane cross-link with themselves and each other. Generally, the Si—H groups on the siloxane polymer react with the vinyl, Si—H and N—H groups of the silazane oligomer. Further, both the silazane and the siloxane have the ability to react with themselves. As a result, a "webbed" type formation is created which bonds to the polyolefin (e.g., polypropylene), acrylate, methacrylate, stainless steel or Teflon pipette tip walls as well as physically entraps the particulate adsorptive material. The cross-linking has the effect of tying up substantially 100% of the bonds of the silazane and siloxane such that substantially no reactive groups are available to interact with an analyte, such as a protein.

The temperature range effective to cross-link the silazane and siloxane to form the silazane/siloxane matrix is from about 25° C. to 250° C. In preparation of an adsorptive bed as a plug in a pipette tip, the temperature range is more typically from about 60° C. to about 250° C.

To effect cross-linking of the adhesive and to remove the solvent, the pipette tips are preferably placed in an oven and heated to between about 130° C. and about 145° C., most preferably at a rate of from about 12° C./min to about 20° C./min. The ramp rate dictates the rate of evaporation of the solvent. Generally, for this embodiment of the invention, the faster the evaporation rate the larger the interstitial spaces that are formed. A preferred ramp rate is about 16° C./min. At rates less than about 12° C./min, the interstitial pores that are formed in the adhesive structure during the heating process are small, thereby restricting flow rates. In contrast, ramp rates greater than about 20° C./min can lead to particle shifting thereby creating macrochannels (large interstitial pores). Depending on the solvent and other variables, adsorbent bed disruption may result from evaporation at ramp rates above about 24° C./min.

Figure 3:
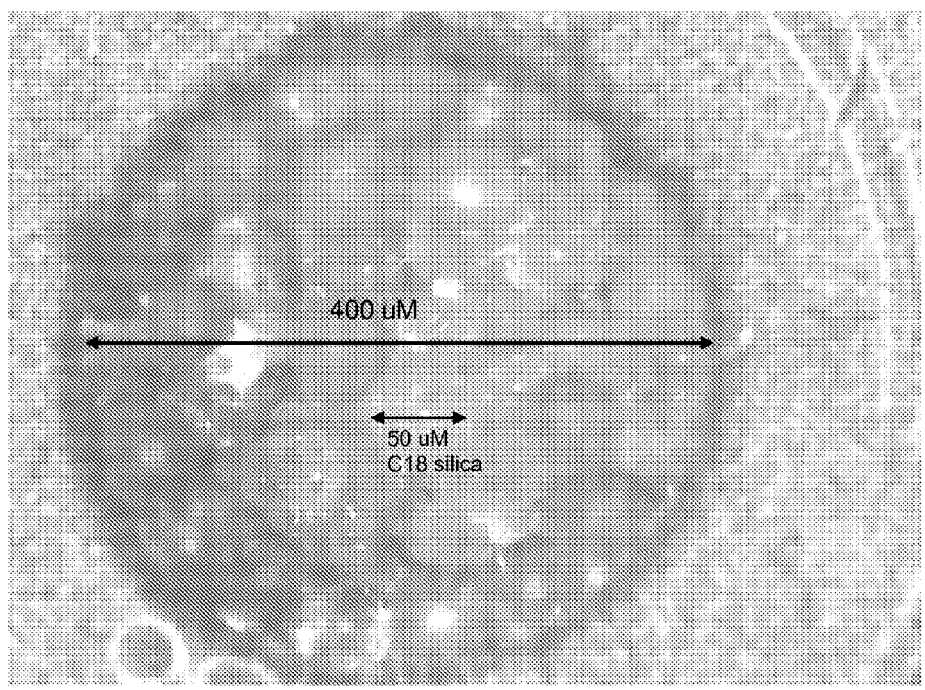
FIG. 3 is a photograph showing morphology of a pipette tip having a fluid-permeable mass in the form of an adsorptive bed before use.
Figure 4:
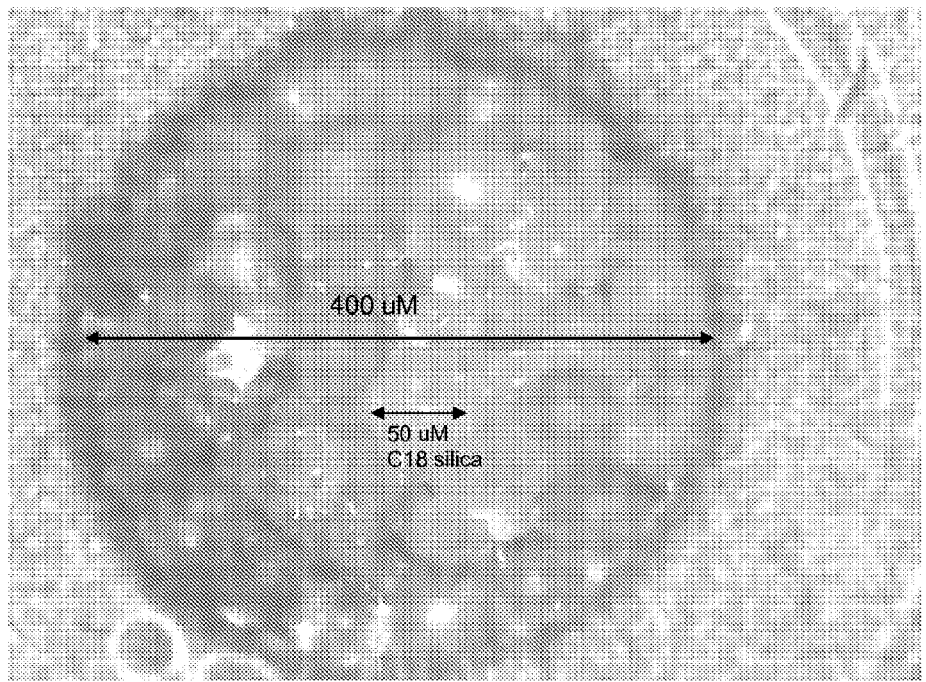
FIG. 4 is a photograph as described in FIG. 3 after use.
Figure 5:
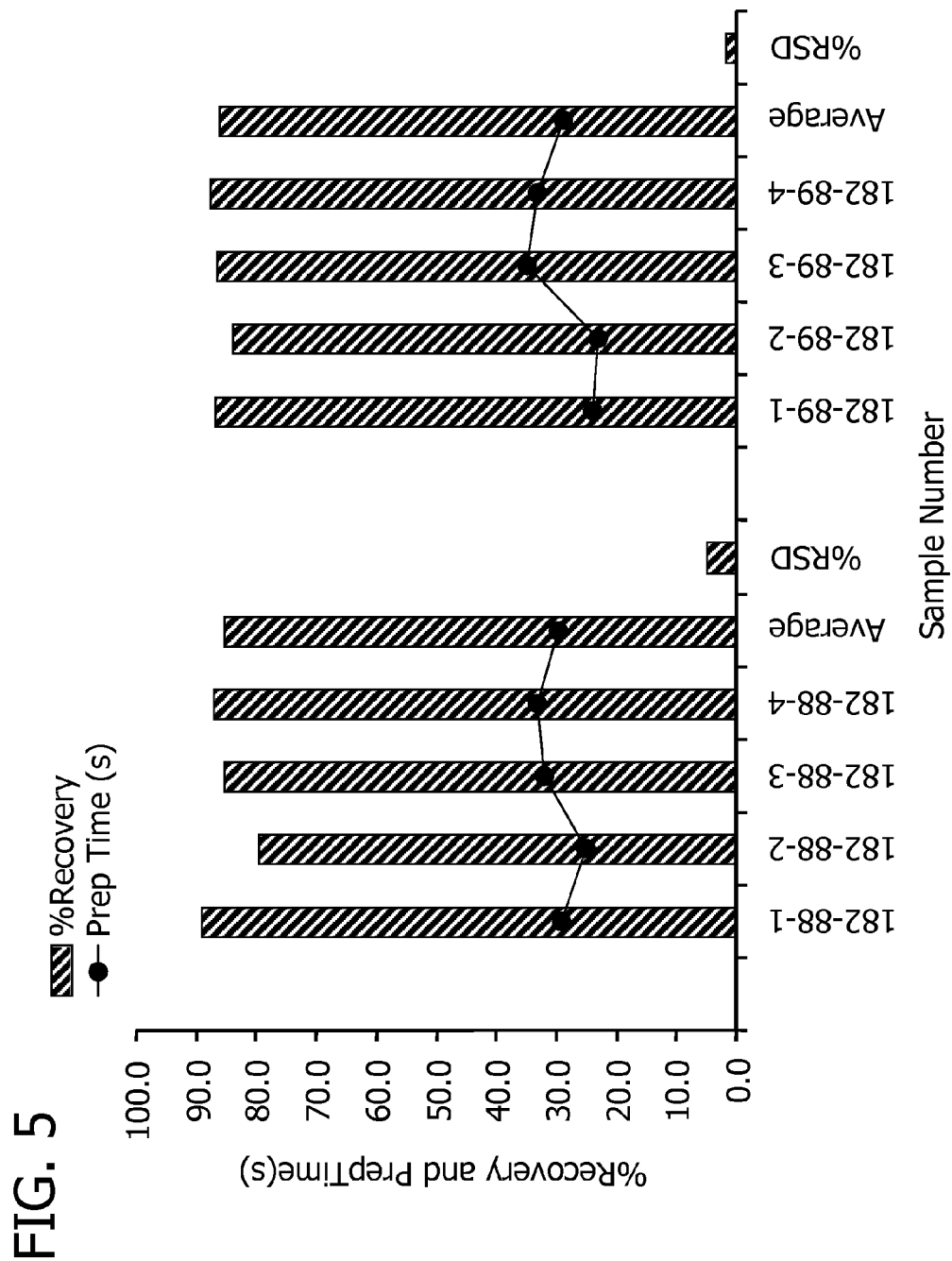
FIG. 5 is a graph depicting flow and recovery data for Substance P, a peptide.

FIG. 3 depicts the micropipette tip morphology of the present invention before use and FIG. 4 depicts the morphology after use. The spherical particles evident from the photographs show the silica-based adsorptive particles forming part of the adsorptive bed. It should be noted that the adsorptive bed is substantially in the same condition after use as before use. Therefore, it may be concluded that, unlike some commercially available pipette tips, the interior/middle of the adsorbent bed does not break or fracture during the pre-wet or adsorptive process. The pipette tips of the present invention possess many (about 100) interstitial space channels which allow for fast flow of the sample through the adsorbent beds and tips. The resulting dispersed flow also allows for superior adsorptive particle/analyte contact, thereby increasing the capacity. In some cases, the capacity is three times that of pipette tips that have been commercially available. Further, the quantity of silica in the pipette tips of the present application is approximately from about 300 to about 600 µg, which is greater than that of tips commonly used in the art. The photographs depicting the present invention show that (a) the 30-75 µM adsorptive particles provide uniform, effective interstitial space resulting in excellent flows; (b) the adhesives of the present invention provide an adsorptive bed with no significant breakage; and (c) capacity is increased since the amount of silica may be increased. The adsorbent plug comprises few if any "macrochannels," the presence of which may otherwise lead to rapid flow of fluid sample through bed, precluding adequate contact between analyte and adsorbent particles. Preferably, the bed is substantially free of such macrochannels. It may be noted that undesirable by-passing of the adsorbent particles can also result from partial breakage during formation of the bed, an effect that is also substantially avoided in the formation of the adsorptive mass in the tip according to the methods described hereinabove. Thus, the plug formed in the tip has a high adsorptive capacity, and is not subject to contamination such as would compromise sample preparation or analysis.

The suspension used in preparing the adsorptive plug in the tip preferably comprises about 1.5% to 5%, preferably about 1.8% to about 2.5%, siloxane, between about 2% and about 7.5%, preferably between about 2% and about 3%, silazane, between about 0.01% and about 1%, preferably between about 0.02% and about 0.75%, initiator, and between about 5% and about 30%, preferably between about 6% and about 20%, adsorptive material. In various embodiments, the polysiloxane content is in the range of 60-100 mg/mL; the polysilazane content is in the range of 60-400 mg/mL; and the solvent represents approximately 75% to 85% of the total weight of the suspension. An exemplary and especially advantageous suspension may comprise approximately: 375 mg/mL of $C_{18}$-silica; 70 mg/mL of siloxane, preferably polydimethyl siloxane; 84 mg/mL of polysilazane; and 4.0 mg/mL of initiator, preferably dicumyl peroxide. The ratio of polysiloxane polymer to polysilazane polymer is from about 1.0 to 0.5 to about 1.0 to about 10.0, more preferably from about 1 to about 1.2 to about 1 to about 5. For example, the composition of the initial suspension may comprise about 70 mg/mL of polysiloxane and about 84 mg/mL of polysilazane.

Although the suspension may be cured in various atmospheres, it is preferably cured in air (i.e., oxygen). Air is preferred because the weight loss of the silazane is minimized, as described above, and the two polymer adhesives react effectively as two polymers with little restructuring of the silazane. By proper selection of solvent, the initial suspension may remain stable for at least 4 hours, and often for at least 48 hours.

Permeability of the polysilazane/polysiloxane matrix has been found superior to the permeability of a matrix formed from either of the components individually. It is theorized that the improved permeability is the result of shrinkage of the entire adhesive mass during heating. The silazane forms a polymer/hard adhesive film around the siloxane and the particulate adsorbent material(s). During the cure process, it is believed that the silazane physically pulls the siloxane out of the interstitial spaces and contracts the adhesive moiety around the particles. Both adhesives are impermeable to the aqueous/liquid sample containing the analyte.

Other characteristics of the matrix include the fact that swelling of the polysiloxane occurs without the silazane, but only insignificant swelling occurs in with the presence of the silazane. Thus, the combination decreases the overall swelling that occurs with in the presence of the polysiloxane alone.

In the pipette tips application of the current embodiment, the polysilazane/polysiloxane matrix should be present in an amount sufficient to produce a stabilized adsorbent bed, but not restrict the flow of the sample. The interstitial channels allow access of the sample analytes to the pores of the particulate adsorptive material and also allow for effective transport of the sample through the bed. The matrix described by this invention has an advantage of effectively adhering the adsorbent bed, while not blocking access of an analyte to the adsorption surface of the pores of the particulate adsorbent material, where the adsorbent is porous, access to the adsorbent pores is also preserved. Minimizing adsorbent pore blockage results in increased opportunity for the target analyte to have contact with the adsorptive surfaces interior to the adsorptive particle and increased yields of the target analyte. By preserving access to the external surfaces, yields are also enhanced where non-porous adsorbents are used.

Consideration governing selection of an adsorbent for the pipette plug are comparable to those discussed for any of the above embodiments. Thus, particulate adsorbent materials include nucleophilic, electrophilic, or neutral materials. Exemplary particulate adsorptive materials may be selected from carbon, organic polymers, silicas, zeolites, aluminas, metal or ceramic powders. Further adsorbent materials include styrene, DVB, ion-exchange resins, enzymes, and interactive/biological reactive materials (i.e., bonded antibodies, antigens, etc.). In a preferred embodiment, the particulate adsorptive material is $C_{18}$-silica.

The particle size distribution of the particulate adsorptive material for this embodiment is such that at least 50% by weight thereof has a particle size from about 1 nanometer to about 1 millimeter. Preferably about 95% by weight of the particulate adsorptive material has a particle size from about 5 to about 75 microns. It is further preferred that about 95% by weight of the particulate adsorptive material have a particle size from about 40 to about 60 microns.

Selection of an initiator for cross-linking of the silazane and siloxane is guided by the nature of the cross-linking groups and the method of cross-linking desired. For example, a peroxide may be used in an effective amount for vinyl functional polymers. The reactivity of vinyl functional polymers is utilized in two major regimes. Vinyl terminated polymers are employed in addition cure systems. The bond forming chemistry is the platinum catalyzed hydrosilylation which proceeds according to the following chemical equation:

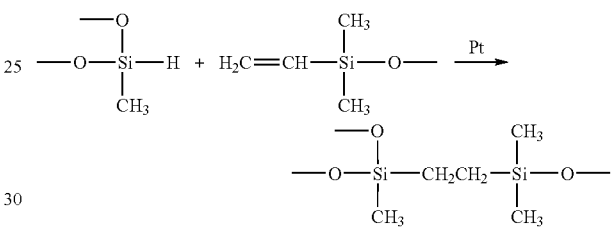

Vinylmethylsiloxane copolymers and vinyl T-structure fluids are mostly employed in peroxide activated cure systems which involve peroxide induced free radical coupling between vinyl and methyl groups. Concomitant and subsequent reactions take place among methyl groups and between cross-link sites and methyl groups. The initial cross-linking reaction is depicted in the following equation:

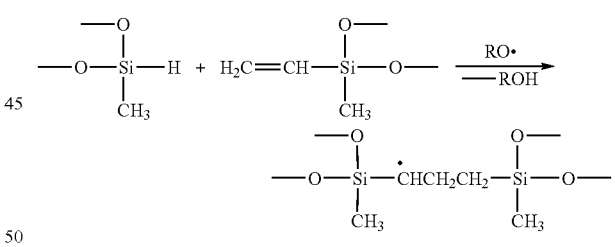

Figure 6:
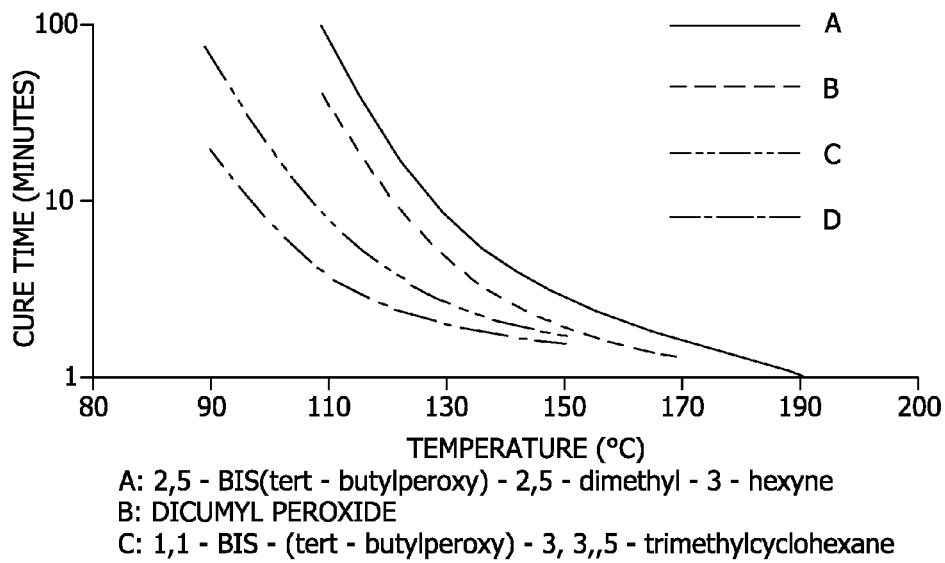
FIG. 6 is a graph depicting the cure time and temperature relationship with respect to selected peroxides (initiators) for conversion of the fluid polysilazane oligomer to the cross-linked polymer.

In a preferred embodiment of the present invention, the cross-linking is initiated via a peroxide activated cure. A person skilled in the art would recognize that various peroxides may be suitable for the cross-linking reaction described herein. In a more preferred embodiment, the initiator is a peroxide selected from the group consisting of 2,5-Bis(tert-butylperoxy)-2,5-dimethyl-3-hexyne, dicumyl peroxide, 1,1-Bis-(tert-butylperoxy)-3,3,5-trimethylcyclohexane, and 2,5-dimethyl-2,5-di(2-ethylhexanoylperoxy)hexane. FIG. 6 depicts the relationship between cure time (minutes) and temperature (° C.) with different peroxides for conversion of the fluid polysilazane oligomer to the cross-linked polymer. In a most preferred embodiment the initiator is dicumyl peroxide.

In addition to vinyl groups, other functional groups may be involved in the cross-linking process. For example, hydride (Si—H) functional groups undergo three main classes of reactivity (general reactions are shown below): hydrosilation, dehydrogenative coupling and hydride transfer. These general reactions may play a role in the cross-linking of the siloxane and silazane with each other and themselves.

Hydrosilylation may occur according to the following general reaction:

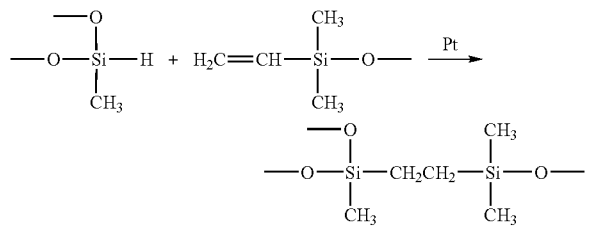

The hydrosilylation of vinyl functional siloxanes, for example, by hydride functional siloxanes is the bases of addition cure chemistry used in 2-part RTVs and LTVs. The preferred catalysts for the reactions are platinum complexes.

Dehydrogenative coupling may occur according to the following general reaction:

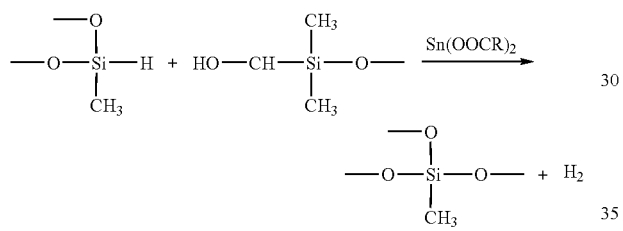

In dehydrogenative coupling, hydroxyl functional materials react with hydride functional siloxanes, for example, in the presence of bis(2-ethylhexanoate)tin, dibutyldilauryltin, zinc octoate, iron octoate or a variety of other metal salt catalysts.

Reduction (hydride transfer) may occur according to the following general reaction:

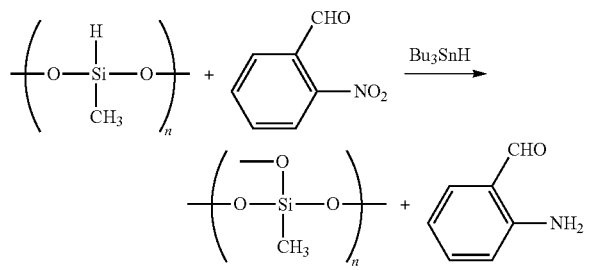

Reduction reactions may be catalyzed by $Pd^0$ of dibutyltinoxide. The choice of reaction conditions leads to chemoselective reduction, e.g., allyl reductions in the presence of ketones and aldehydes.

Silanol (Si—OH) functional polymers may render the siloxane or silazane susceptible to condensation under both mild acid and base conditions. Low molecular weight silanol fluids are generally produced by kinetically controlled hydrolysis of chlorosilanes. Higher molecular weight fluids can be prepared by equilibrating low molecular weight silanol fluids with cyclics, equilibrium polymerization of cyclics with water under pressure or methods of polymerization that involve hydrolyzeable end caps such as methoxy groups. As one skilled in the art will appreciate, methods such as moisture curing may be used for this type of functional groups. Common moisture cure systems include acetoxy, enoxy, oxime, alkoxy and amine functional groups and may proceed as outlined in the following general reactions:

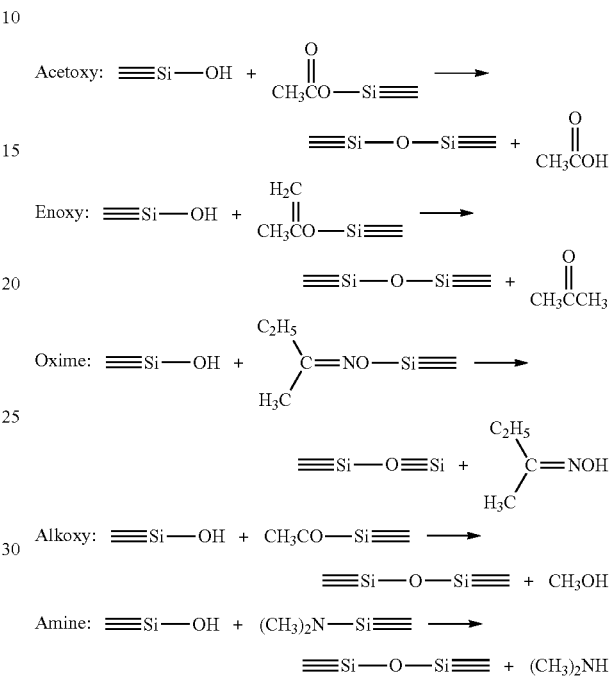

Further, aminofunctional silicones (i.e., Si—$CH_2CH_2CH_2NH_2$) have a broad array of applications as a result of their chemical reactivity, their ability to form hydrogen bonds and, particularly in the case of diamines, their chelating ability. Additional reactivity can be built into aminoalkyl groups in the form of alkoxy groups.

Epoxy functional silicones

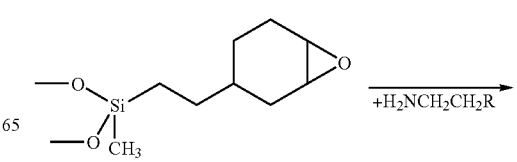

undergo cross-linking reactions with amines. The ring-strained epoxycyclohexyl group is more reactive than the epoxypropoxy group and undergoes thermally or chemically induced reactions with nucleophiles including protic surfaces such as cellulosics. Epoxycyclohexyl functional siloxanes may polymerize on UV exposure in the presence of weak donor catalysts according to the following general reaction:

-continued

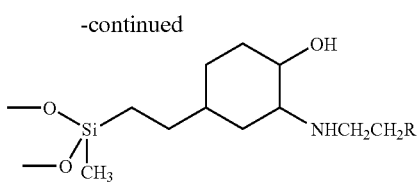

Carbinol (hydroxyl group bound to a carbon) terminated functional siloxanes contain primary hydroxyl groups which are linked to the siloxane backbone by non-hydrolyzeable transition groups. Frequently, a transition block of ethylene oxide or propylene oxide is used. Carbinol functional polydimethylsiloxanes may be reacted into polyurethanes, epoxies, polyesters and phenolics.

Methacrylate and acrylate functional siloxanes (shown below),

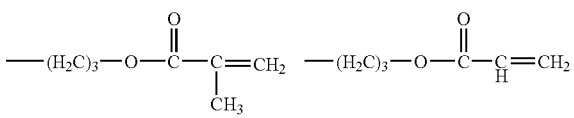

undergo the same reactions generally associated with methacrylates and acrylates, the most conspicuous being radical induced polymerization. These functional groups are also often utilized in UV cure systems.

Other functional groups that may be present as substituents on the siloxane or silazane include isocyanate, carboxylate, mercapto, chloroalkyl, and anhydrides.

Although other formulae have been used, according to *J. Fluid Mech.* 370, 79 (1998), the aspect ratio of the adsorptive beds is measured by the bed length divided by the average bed radius at midpoint of the bed as determined by the following formula:

$$\text{aspect ratio} = \frac{L}{(r_0 2 + r_0 1)/2}$$

Figure 2:
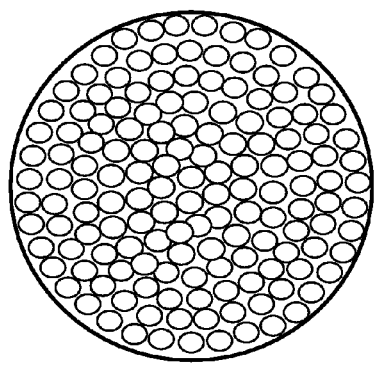
FIG. 2 is a schematic end view of a pipette having a fluid-permeable mass in the form of an adsorptive bed for use in a pipette tip.

"L" is the bed length, "$r_0 1$" is the first radius measurement, and "$r_0 2$" is the second radius measurement. $r_0 1$ may be measured at the top of the bed while $r_0 2$ is measured at the bottom of the bed, nearest the pipette orifice (see FIG. 1). The radius is generally measured in microns. When measured according to the formula recited above, the aspect ratio of the pipette tips may be anywhere from about 2 to about 40. A lower aspect ratio may decrease retention time, but adsorption may be reduced because less adsorptive material is available for binding the desired analyte. On the other hand, higher aspect ratios may be beneficial by allowing for increased contact time and available surface for contact between the adsorbent and analyte. Thus, for certain applications, the aspect ratio is preferably at least 11, more preferably at least 15, still more preferably at least 20. For certain pipette tip applications, the aspect ratio is preferably between about 10 and about 25. For certain other applications, the aspect ratio is preferably at least 2, more preferably at least 5. For still other applications, the aspect ratio may between about 2 and about 12, more preferably between about 3 and about 8. In an exemplary embodiment, the pipette tips described herein have a tip orifice of about 350 to about 750 µM and the total area percentage (the cross-sectional area presented by the projection of the first layer of particles onto the plane of the tip orifice) of particles at the tip orifice is about 90 to about 93% (see FIG. 2). Further, the total area percentage of void spaces at the tip orifice is generally from about 7 to about 10%.

While pipette tips represent a preferred application of the fluid-permeable adsorption mass of this invention, there are other advantageous applications. Other useful structures include wells, multi-well arrays, plastic and glass cavities, and sample preparation devices. A solid phase adsorption device may comprise a fiber bearing an adsorptive coating comprising a matrix having a particulate adsorptive material lodged therein. For example, such a coating may be provided over the fiber of a solid phase microextraction device as described in Pawliszyn U.S. Pat. No. 5,691,206, the entire disclosure of which is incorporated herein by reference. The matrix comprises an amorphous non-glassy ceramic composition as described hereinabove. Optionally, the interior of the syringe barrel illustrated in the Pawliszyn patent and/or the interior and exterior of the housing surrounding the fiber may have a passivation coating comprised of the same or similar ceramic.

According to a further alternative, a solid phase adsorptive device may comprise a fluid-permeable adsorptive bed contained within a vessel or conduit. More particularly, the solid phase adsorptive device may comprise a conduit or vessel having particulate adsorptive material entrapped therewithin by a binder comprising a polysilazane polymer and a polysiloxane polymer. The solid phase adsorptive device may contain a fluid-permeable mass which comprises the binder and particulate adsorbent material. Typically, the fluid-permeable mass has a permeability of about 5 to about 10 µL/second. Further, the invention contemplates the solid phase adsorptive device of the present embodiment having an adsorptive zone, which contains the particulate adsorbent material, in a concentration of at least 0.2 g/cc. In a preferred embodiment, the particulate adsorbent is present in a concentration between about 0.2 and about 0.5 g/cc. In one embodiment, the adsorptive zone is such that the surface area of said adsorptive material within the zone is at least about 10 $m^2$/cc.

The present invention further contemplates a process for preparing a fluid-permeable mass comprising a particulate adsorbent material dispersed in a polymeric matrix comprising: preparing a dispersion comprising the particulate adsorbent material in a liquid medium comprising a solvent, a polymerizable silazane and a polymerization initiator, the polymerizable silazane comprising a polysilazane monomer, a polysilazane oligomer, or a mixture thereof; and polymerizing the polymerizable silazane to form said fluid-permeable mass.

Also contemplated by the present invention is a method for isolating a target compound from a sample comprising a fluid medium containing said compound, the method comprising: drawing the sample into a vessel or conduit containing an adsorbent bed, the adsorbent bed comprising particulate adsorbent material dispersed in an adhesive matrix or entrapped by an adhesive binder; and allowing said target compound to be adsorbed to particles of said adsorbent material. The adhesive matrix or binder comprises a polysilazane polymer and a polysiloxane polymer.

The following examples illustrate the invention.

EXAMPLE 1

A ⅛" thick aluminum coupon was cleaned thoroughly with soap and water removing any surface debris with a steel wool pad. The aluminum sample was then rinsed with distilled water and placed in an oven at 200° C. for approximately 10 minutes. A solution consisting of thermoset polysilazane (2.5 g), dicumyl peroxide (0.05 g) and pentane (50 ml) was loaded into a touch up spray gun (Badger Model 400). The aluminum coupon was removed from the oven and immediately sprayed creating a uniform, vulcanized coating on its surface. The sample was then placed in an oven for further curing to the preceramic state via an oven ramp at 200° C. for 10 minutes, then at 450° C. for 10 minutes. The film appeared homogenous, crack free with no signs of delamination when studied under magnification with a light microscope.

EXAMPLE 2

A ¾" copper tube was cleaned thoroughly with soap and water removing any surface debris with a steel wool pad. The copper sample was then rinsed with distilled water and placed in an oven at 200° C. for approximately 10 minutes. A solution consisting of thermoset polysilazane (2.5 g), dicumyl peroxide (0.05 g) and pentane (50 ml) was loaded into a touch up spray gun (Badger Model 400). The copper tube was removed from the oven and immediately sprayed creating a uniform, vulcanized coating on its surface. The sample was then placed in an oven equipped with a helium purge vessel for further curing to the preceramic state via an oven ramp at 200° C. for 10 minutes, then at 450° C. for 10 minutes. The film appeared homogenous, crack free with no signs of delamination when studied under magnification with a light microscope.

EXAMPLE 3

The inner diameter of a 4 mm HPLC column was cleaned thoroughly with methylene chloride and permitted to air dry. A solution consisting of thermoset polysilazane (2.5 g), dicumyl peroxide (0.05 g) and pentane (50 ml) was prepared as the coating solution. A lint free applicator was dipped in the solution and whisked to remove excess material. The inner surface of the column was painted with the applicator resulting in a thin even coating. The column was then placed in an oven in the upright position for curing to the preceramic state via an oven ramp at 200° C. for 10 minutes, then at 450° C. for 10 minutes. The coating was subjected to low pH mobile phase conditions without degradation.

EXAMPLE 4

Acid washed borosilicate wool (10 g) was saturated with a solution of thermoset polysilazane (1 g), dicumyl peroxide (0.02 g), and pentane (500 ml). Excess solution was removed from the wool before drying with a nitrogen purge. The wool was transferred to an oven for curing to the preceramic state via an oven ramp at 200° C. for 10 minutes, then at 450° C. for 10 minutes. This treated wool was found to significantly reduce pesticide breakdown when packed in a gas chromatographic inlet sleeve.

EXAMPLE 5

Surfaces of a steel powder-dispensing device were cleaned thoroughly with methylene chloride and permitted to air dry. A solution consisting of thermoset polysilazane (2.5 g), dicumyl peroxide (0.05 g) and pentane (50 ml) was prepared as the coating solution. A lint free applicator was dipped in the solution and whisked to remove excess material. The surfaces of the filling device were painted with the applicator resulting in a thin even coating. The devices were placed in an oven for curing to the preceramic state via an oven ramp at 200° C. for 10 minutes, then at 450° C. for 30 minutes. The coating was subjected to powders containing silver nitrate for extended times without degradation.

EXAMPLE 6

Stainless steel frits (2 μm pore size) used commonly in HPLC columns were cleaned thoroughly with methylene chloride and permitted to air dry. A solution consisting of thermoset polysilazane (2.5 g), dicumyl peroxide (0.05 g) and pentane (50 ml) was prepared as the coating solution. Multiple frits were submerged in the coating solution using a cylindrical glass vial. Excess solution was decanted, the vial was flushed with a nitrogen purge in order to purge excess solution from the pores of the frit. The frits were placed in an oven for curing to the preceramic state via an oven ramp of 200° C. hold 10 minutes, then 450° C. hold 30 minutes. The frits were used in the preparation of 4 mm i.d. HPLC columns for the analysis of peptide materials resulting in normal mobile phase flow rates and excellent surface inertness.

EXAMPLE 7

A 10 μl Hamilton syringe needle was coated on its interior by pulling a solution of thermoset polysilazane (1 g), dicumyl peroxide (0.02 g) and pentane (50 ml) utilizing the plunger of the syringe. The plunger was depressed expelling the coating solution and removed to allow a light nitrogen purge down the length of the barrel to remove excess solution. The exterior of the needle was dip coated before the syringe needle was suspended in a small barrel heater for 25 minutes at a temperature of 400° C. The syringe was found to be in perfect working order after the above treatment.

EXAMPLE 8

A solventless suspension of 2-3 μm, 6-2000 Å pore size Carboxen 1006 (Supelco Corporation) (4 g), thermoset polysilazane (1 g), and dicumyl peroxide (0.08 g) was prepared and shaken vigorously. A few drops of this formulation were placed on a glass microscope slide. A nitinol fiber was passed thru the droplet horizontally then rolled on a clean section of slide to remove excess material. The coated fiber was heated for approximately 15 seconds with an industrial heat gun to cure the polysilazane material in creation of a polymeric binder. The fiber was then recoated three additional times to create a 40 μm layer of bound adsorbent. The fiber was suspended in a small barrel heater equipped with an inert gas purge in which it was cured to the preceramic state at 400° C. for 10 minutes. The fiber was found to extract and desorb a variety of organic compounds with no sign of adsorbent pore blockage. The polysilazane binder resisted cracking and showed no signs of delamination from the nitinol wire.

EXAMPLE 9

5 μm, 120 Å pore size silica gel (Diasogel) (5 g) was saturated with a 20 ml solution of thermoset polysilazane (1 g), dicumyl peroxide (0.02 g), and pentane (50 ml). The excess solvent was allowed to evaporate in a fume hood. The silica was placed in an oven where the coating was transformed to the preceramic state via an oven ramp of 200° C. hold 10 minutes, then 450° C. hold 30 minutes. The silica gel was chemically bonded with octadecyl silane and used in the preparation of an HPLC column. A standard reversed phase test mix revealed near equivalent chromatography to that of a control octadecyl silane HPLC column. Carbon loadings on the polysilazane coated material were also found to be equivalent.

EXAMPLE 10

A suspension of 1-10 μm, 500-600 Å pore size Carbopack Z (Supelco Corporation) (670 mg), thermoset polysilazane (3 g), dicumyl peroxide (0.06 g) and pentane (15 ml) was prepared and shaken vigorously. The suspension was loaded into a Badger 400 touch up sprayer used in coating the fibers to 20-30 μm thickness. The fiber was suspended in a small barrel heater equipped with an inert gas purge in which it was cured to the preceramic state at 400° C. for 10 minutes. The fiber was found to extract and desorb a variety Arochlor congeners with no sign of adsorbent pore blockage. The polysilazane binder resisted cracking and showed no signs of delamination from the stainless steel wire.

EXAMPLE 11

A suspension of 2-3 μm, 6-2000 Å pore size Carboxen 1006 (Sulpelco Corporation) (250 mg), thermoset polysilazane (500 mg), dicumyl peroxide (25 mg) and methylene chloride (1 ml) was prepared and shaken vigorously. One end of a 15 cm long 0.25 mm i.d. fused silica tube was plugged and raised slowly into a tube furnace heated at 200° C. The tube was then connected to a gas chromatograph injection port and heated to 360° C. for 10 minutes with a helium purge. A flexible layer of entrapped bound particles resulted inside the fused silica tube.

EXAMPLE 12

A chloroform suspension containing 50 μm, 200 Å pore size octadecyl silylated silica (Supelco Corporation), thermoset polysilazane, polydimethyl siloxane and dicumyl peroxide was prepared and shaken vigorously. The suspension was drawn into pipette tips, placed in a freeze dryer at 0° C. for approximately 10 minutes then transferred to an oven for vulcanization at 145° C. The polysilazane additive was found to crystallize while under freeze drying conditions preventing gravity settling of the silica particles. Beds prepared with this method provided consistent solvent flow rates, mechanical stability and high extraction efficiency for various biomolecules.

EXAMPLE 13

Surfaces of a tool steel-dispensing device were sandblasted to remove oxides and surface impurities. The devices were blown clean with a nitrogen purge in order to remove debris before coating. A suspension consisting of thermoset polysilazane (5 g), 3 um zirconium powder (1 g) in methylene chloride (5 ml) was prepared for coating. The suspension was shaken vigorously then brush coated on the dispensing device with a lint free applicator. The devices were placed in an oven, which was rapidly heated to 450° C. for a period of 30 minutes then cooled slowly. The resulting coating provided extended oxidation and abrasion resistance to acidic silica powders.

EXAMPLE 14

15 meter lengths of 0.53 mm internal diameter 316 stainless steel tubes were flushed with a coating solution (2 ml) composed of thermoset polysilazane (10 g), dicumyl peroxide (0.2 g), dissolved in pentane (50 ml). The flush was approximately 4 p.s.i. nitrogen pressure. The tubes were allowed to purge for 30 minutes then placed in an oven at 200° C. for 10 minutes and 450° C. for 30 minutes. The coated columns were tested for inertness as a transfer line between a gas chromatographic injection port system and an inert methyl silicone capillary column connected to a PDD detector in helium ionization mode. Trace amounts of sulfur gases and water vapor were transferred without adsorption to the capillary column. The results are shown in FIG. 8.

EXAMPLE 15

A solution of thermoset polysilazane (1 g), dicumyl peroxide (0.02 g) dissolved in pentane (50 ml) was coated on a potassium bromide sample plate. An infrared spectrum of the film was recorded after heat treatment at 200° C. and 450° C. in an air filled oven. Absorption bands associated with silazane, silicon hydride and vinyl functional groups disappeared after the high temperature cure. The results are shown in FIG. 10.

EXAMPLE 16

Figure 9:
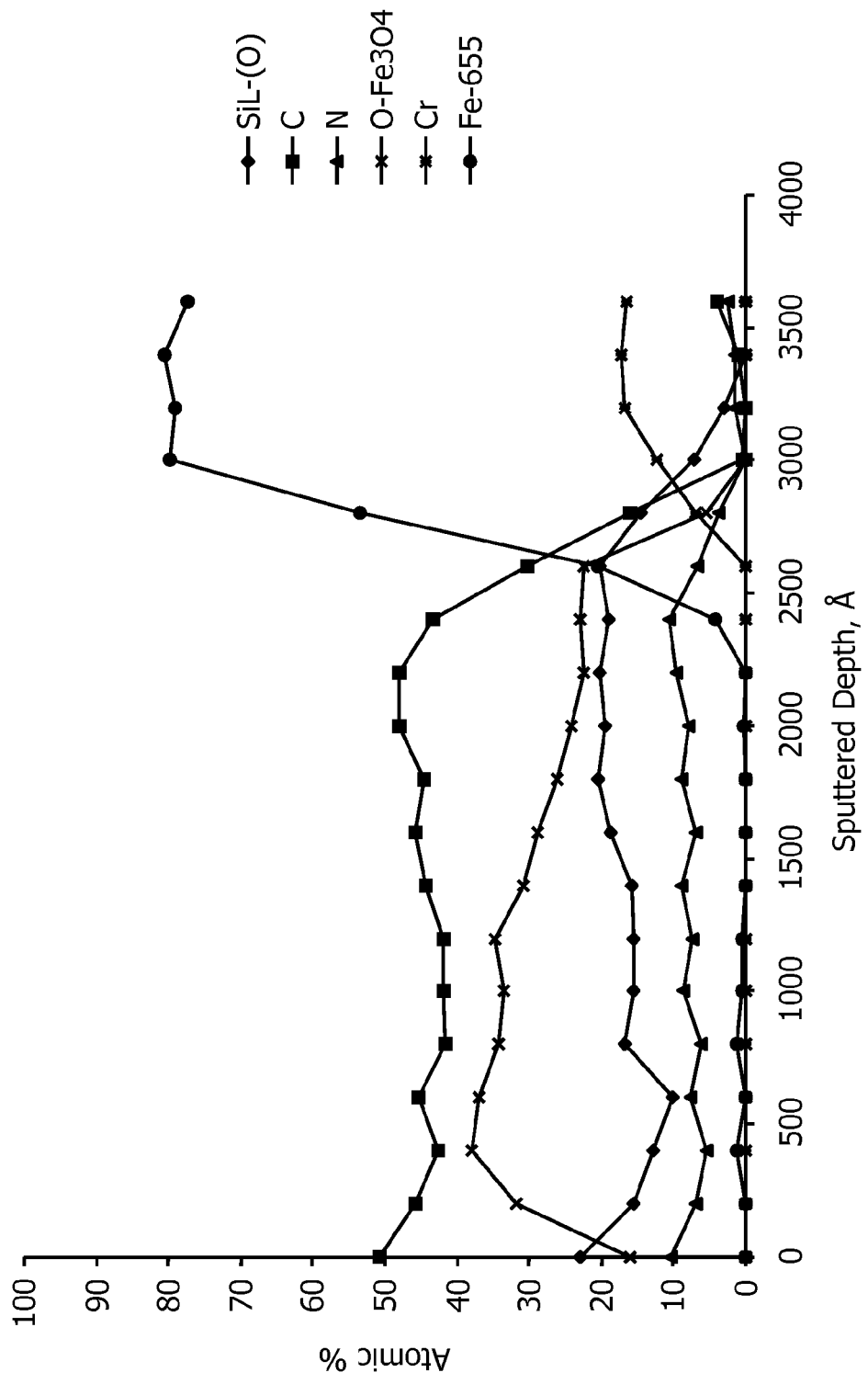
FIG. 9 is a depth profiling analysis for silicon, carbon, nitrogen, chromium, iron and oxygen using Energy Dispersive Spectroscopy (EDS) as described in Example 16.

A solution consisting of thermoset polysilazane (2.5 g), dicumyl peroxide (0.05 g) and pentane (50 ml) was prepared. A lint free applicator was used to apply a single coat of material on a 1/16" stainless steel panel. The panel was heated for 10 minutes at 200° C. then 30 minutes at 450° C. in air. Using EDS, a sputter profile of the resulting coated surface revealed a ceramic layer of approximately 3000 angstroms containing residual carbon and nitrogen species in a predominately silicon and oxygen ceramic matrix. The results are shown in FIG. 9.

EXAMPLE 17

Polydimethyl siloxane (70 mg/ml), thermoset polysilazane (84 mg/ml), dicumyl peroxide (4.0 mg/ml), and pentachloroethane were added to 7 ml vial and mixed for 1.0 hours using a vortex mixer. This mixture was then added to a second 7 ml vial containing 50-60 μM 200 Å pore silica (375 mg/ml) and mixed for 15 minutes on a vortex mixer. The resulting suspension was chilled overnight at 5-10° C. The suspension was then allowed to reach room temperature for 30 minutes followed by mixing on vortex mixer for 10 minutes.

The pipette tips were prepared using a 10 (or 20 μl) pipettor set to a 3.0 μl draw volume. 3.0 μl of the suspension was drawn into each tip. The tips were placed in a rack and heated in an oven to 145° C. at 16° C./minute, hold at 145° C. for 10 minutes. The oven was allowed to cool below 60° C. and the tips removed.

EXAMPLE 18

The samples for the Carboxen-1006 DFT plot (FIG. 11A) were prepared as follows. Initially, the non-bonded Carboxen-1006 was tested using porosimetry. The bonded Carboxen-1006 was prepared in a 100 milliliter beaker using a suspension of carbon and adhesive suspended in dichloromethane. The ratio of carbon to adhesive was 1:4. The suspension was then dried in a convection oven at ambient until the carbon powder was free-flowing, and the powder was subsequently bonded at 350° C. The resulting mass of carbon/adhesive was then tested using porosimetry.

The samples for the silica DFT plot were prepared using a suspension process as described in Example 17 (i.e., 70 mg/mL siloxane, 84 mg/mL silazane and 375 mg/mL of 300

Å C18 bonded silica), but instead of filling tips, the suspension was placed in a 100 milliliter beaker and bonded at 145° C. for 10 minutes. The bonded silica mass was removed from the beaker by scraping/dislodging the mass and analyzed using porosimetry.

What is claimed is:

1. An adsorptive structure comprising particulate adsorptive material lodged in a matrix, wherein the matrix comprises an amorphous non-glassy ceramic composition, and wherein the matrix is derived from a cross-linked polymer chosen from a polysilazane, a polysiloxane, or a mixture of a polysilazane and a polysiloxane.

2. The adsorptive structure of claim 1 wherein the ceramic composition comprises at least about 30% carbon atoms, at least about 2% nitrogen atoms, between about 10% and about 50% silicon atoms, and at least about 10% oxygen atoms.

3. The adsorptive structure of claim 1 comprising between about 0.1 and about 99.8% by weight particulate adsorptive material.

4. The adsorptive structure of claim 1 wherein the particulate adsorptive material is chosen from carbon particles, organic polymer particles, silica particles, zeolite particles, alumina particles, and metal or ceramic powders.

5. The adsorptive structure of claim 4 wherein at least about 95% by weight of the particulate adsorptive material has a particle size from about 40 microns to about 60 microns.

6. The adsorptive structure of claim 1 wherein at least 1% by weight of the particulate adsorptive material has a particle size ranging from about 0.1 micron to about 10 microns.

7. The adsorptive structure of claim 1 wherein the adsorptive material lodged in the matrix has essentially the same distribution of pore widths as the adsorptive material in isolation.

8. The adsorptive structure of claim 1, wherein the adsorptive structure comprises a plurality of discrete bodies, wherein each of the plurality of discrete bodies comprises the particulate adsorptive material lodged in the matrix.

9. The adsorptive structure of claim 8, wherein the adsorptive structure is an adsorptive bed comprising the plurality of discrete bodies.

10. The adsorptive structure of claim 1 wherein the matrix is substantially not irreversibly adsorptive of an analyte or other target compound that is adsorbed by the particulate adsorptive material.

11. An adsorptive structure comprising particulate adsorptive material lodged in a matrix comprising an amorphous non-glassy ceramic composition and/or adhered to an underlying surface via a film comprising an amorphous non-glassy ceramic composition, said ceramic composition comprising an oligomer comprising repeating units in which nitrogen is combined with an element selected from the group consisting of silicon, a Group III metal, a Group IVA metal, a Group IVB metal, and combinations thereof, and wherein said oligomer comprises repeating units having the formula:

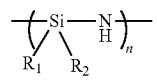

wherein:

$R_1$ is selected from the group consisting of hydrogen, vinyl, alkyl, hydroxy, alkoxy, amino, alkylamino, mercapto, acetoxy, halo, hydroxyalkyl, dimethylamino, oxime, isocyanate, $CH_2Q$-$(OCH_2CH_2)_n OH$,

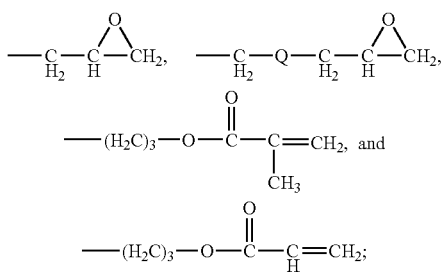

$R_2$ is selected from the group consisting of methacryl, $C_{1-20}$ alkyl, $C_{2-20}$ alkenyl, fluoroalkyl, carbonyl, carbinol, glycidyl, straight, branched or cyclic —$(CH_2$—$O$—$CH_2)_n$, and aryl optionally substituted with $C_{1-6}$ alkyl, fluoro, chloro, cyano or aryl;

Q is $C_{1-8}$ alkyl; and n is 1 to about 20.

12. An adsorptive structure comprising a particulate adsorptive material lodged in a matrix comprising an amorphous non-glassy ceramic composition and/or adhered to an underlying surface via a film comprising an amorphous non-glassy ceramic composition wherein said ceramic composition is derived from an oligomer having the formula:

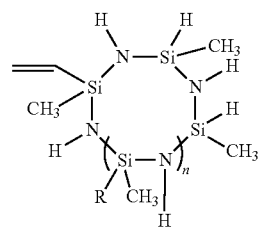

wherein R is H or —$CH$=$CH_2$ and n is 1 to 20.

* * * * *